US010399258B2

(12) United States Patent
Atkins et al.

(10) Patent No.: US 10,399,258 B2
(45) Date of Patent: Sep. 3, 2019

(54) HEAT FLOW CONTROL FOR MOLDING DOWNHOLE EQUIPMENT

(71) Applicant: Halliburton Energy Services, Inc., Houston, TX (US)

(72) Inventors: William Brian Atkins, Houston, TX (US); Gary Eugene Weaver, Conroe, TX (US); Valerie Sillen, Brussels (BE)

(73) Assignee: Halliburton Energy Services, Inc., Houston, TX (US)

( * ) Notice: Subject to any disclaimer, the term of this patent is extended or adjusted under 35 U.S.C. 154(b) by 340 days.

(21) Appl. No.: 14/962,896

(22) Filed: Dec. 8, 2015

(65) Prior Publication Data

US 2016/0089821 A1   Mar. 31, 2016

Related U.S. Application Data

(62) Division of application No. 13/990,308, filed as application No. PCT/EP2011/071038 on Nov. 25, 2011.

(30) Foreign Application Priority Data

Nov. 29, 2010   (GB) .................................. 1020235.6

(51) Int. Cl.
*B22C 9/02*       (2006.01)
*B22D 19/14*    (2006.01)
(Continued)

(52) U.S. Cl.
CPC ................ *B29C 43/18* (2013.01); *B22C 9/02* (2013.01); *B22C 9/10* (2013.01); *B22C 21/14* (2013.01);
(Continued)

(58) Field of Classification Search
CPC .. B22C 9/02; B22C 9/10; B22C 21/14; B22D 19/14; B22D 27/04; B28B 7/00
(Continued)

(56) References Cited

U.S. PATENT DOCUMENTS 3,173,314 A    3/1965 Blackmer
3,279,005 A    10/1966 Wehmeyer
(Continued)

FOREIGN PATENT DOCUMENTS

CA    2005527    8/1990
DE    3247343    12/1982
(Continued)

OTHER PUBLICATIONS

Office Action received for Great Britain Patent Application No. GB1020235.6, dated Oct. 2, 2017; 6 pages.
(Continued)

*Primary Examiner* — Kevin P Kerns
(74) *Attorney, Agent, or Firm* — Baker Botts L.L.P.

(57) ABSTRACT

There is disclosed herein a method of designing a mold, the mold being at least part of a unitary body to be formed from a plurality of layers by 3D printing, the method including defining an inner surface of the mold corresponding to at least part of an outer surface of an object to be molded in the mold; selecting a first material from which at least part of the mold is to be printed; and selecting a second material from which at least another part of the mold is to be printed, the second material having a higher thermal and/or electrical conductivity than the first material, wherein at least one of the layers from which the mold is to be formed by 3D printing includes areas to be printed from each of the first and second materials.

19 Claims, 13 Drawing Sheets

(51) Int. Cl.
*B22D 27/04* (2006.01)
*B29C 43/18* (2006.01)
*B22C 9/10* (2006.01)
*B22C 21/14* (2006.01)
*B22F 3/03* (2006.01)
*B22F 3/105* (2006.01)
*B22F 5/00* (2006.01)
*E21B 10/00* (2006.01)
*B29C 64/00* (2017.01)
*B33Y 10/00* (2015.01)
*B33Y 80/00* (2015.01)
*B29L 31/00* (2006.01)

(52) U.S. Cl.
CPC ............. *B22D 19/14* (2013.01); *B22D 27/04* (2013.01); *B22F 3/03* (2013.01); *B22F 3/1055* (2013.01); *B22F 5/00* (2013.01); *B29C 64/00* (2017.08); *E21B 10/00* (2013.01); *B29L 2031/757* (2013.01); *B29L 2031/772* (2013.01); *B33Y 10/00* (2014.12); *B33Y 80/00* (2014.12); *Y02P 10/292* (2015.11); *Y02P 10/295* (2015.11)

(58) Field of Classification Search
USPC ........... 164/349, 361, 15, 122, 137; 249/111
See application file for complete search history.

(56) References Cited

U.S. PATENT DOCUMENTS

| | | | |
|---|---|---|---|
| 4,133,371 A | 1/1979 | Birch et al. | |
| 4,243,199 A | 1/1981 | Hill | |
| 4,398,952 A | 8/1983 | Drake | |
| 4,884,477 A | 12/1989 | Smith et al. | |
| 5,147,587 A | 9/1992 | Marcus et al. | |
| 5,204,055 A | 4/1993 | Sachs et al. | |
| 5,373,907 A | 12/1994 | Weaver | |
| 5,433,280 A | 7/1995 | Smith | |
| 5,549,697 A | 8/1996 | Caldarise | |
| 5,555,481 A | 9/1996 | Rock et al. | |
| 5,839,329 A | 11/1998 | Smith et al. | |
| 5,957,006 A | 9/1999 | Smith | |
| 6,073,518 A | 6/2000 | Chow | 419/27 |
| 6,112,804 A | 9/2000 | Sachs et al. | |
| 6,148,899 A | 11/2000 | Cornie et al. | |
| 6,200,514 B1 | 3/2001 | Meister | |
| 6,209,420 B1 | 4/2001 | Butcher | 419/28 |
| 6,296,069 B1 | 10/2001 | Lamine et al. | |
| 6,302,224 B1 | 10/2001 | Sherwood et al. | |
| 6,353,771 B1 | 3/2002 | Southland | |
| 6,363,606 B1 | 4/2002 | Johnson, Jr. et al. | |
| 6,375,877 B2 | 4/2002 | Lauf et al. | |
| 6,397,922 B1 | 6/2002 | Sachs et al. | |
| 6,405,095 B1 | 6/2002 | Jang et al. | |
| 6,454,030 B1 | 9/2002 | Findley et al. | |
| 6,454,811 B1 | 9/2002 | Sherwood | 623/23.72 |
| 6,519,500 B1 | 2/2003 | White | |
| 6,655,481 B2 | 12/2003 | Findley et al. | |
| 6,662,857 B2 | 12/2003 | Willfort et al. | |
| 7,070,734 B2 | 7/2006 | Liu et al. | |
| 7,101,168 B1 | 9/2006 | Willemsen | |
| 7,829,000 B2 | 11/2010 | Farr et al. | |
| 8,047,260 B2 | 11/2011 | Uno | 164/97 |
| 8,485,809 B2 | 7/2013 | Dagorn et al. | |
| 8,512,029 B2 | 8/2013 | Stoiber et al. | |
| 2002/0096306 A1 | 7/2002 | Butcher et al. | |
| 2002/0171177 A1 | 11/2002 | Kritchman | |
| 2003/0015308 A1 | 1/2003 | Fosaaen et al. | |
| 2003/0062145 A1 | 4/2003 | Frasier et al. | |
| 2003/0074096 A1 | 4/2003 | Das et al. | 703/1 |
| 2003/0094730 A1 | 5/2003 | Dourfaye | 264/219 |
| 2003/0114936 A1 | 6/2003 | Sherwood et al. | |
| 2004/0056378 A1 | 3/2004 | Bredt et al. | |
| 2004/0225398 A1 | 11/2004 | Silverbrook | |
| 2005/0015171 A1 | 1/2005 | Cruz-Uribe | |
| 2005/0035115 A1 | 2/2005 | Anderson et al. | |
| 2005/0053798 A1 | 3/2005 | Maekawa et al. | |
| 2005/0084377 A1 | 4/2005 | Dambrine et al. | |
| 2005/0093208 A1 | 5/2005 | Boyd et al. | |
| 2005/0104257 A1 | 5/2005 | Gu et al. | |
| 2005/0133277 A1 | 6/2005 | Dixon | |
| 2006/0158456 A1 | 7/2006 | Zinniel et al. | |
| 2006/0198916 A1 | 9/2006 | Beeck et al. | |
| 2007/0277651 A1 | 12/2007 | Calnan et al. | |
| 2008/0233302 A1 | 9/2008 | Elsner et al. | |
| 2008/0251243 A1 | 10/2008 | Dimter et al. | |
| 2009/0004381 A1 | 1/2009 | Fujisawa et al. | |
| 2009/0025984 A1 | 1/2009 | Buteaud et al. | |
| 2009/0028697 A1 | 1/2009 | Shi et al. | 415/200 |
| 2009/0301788 A1 | 12/2009 | Stevens et al. | |
| 2010/0009133 A1 | 1/2010 | Chait | |
| 2010/0044903 A1 | 2/2010 | Rhoades et al. | |
| 2010/0101747 A1 | 4/2010 | Tomczak et al. | |
| 2010/0133805 A1 | 6/2010 | Stevens | 285/18 |
| 2010/0278604 A1 | 11/2010 | Glass | 408/199 |
| 2010/0327479 A1 | 12/2010 | Zinniel et al. | |
| 2011/0129380 A1 | 6/2011 | Angles | |
| 2013/0313403 A1* | 11/2013 | Atkins et al. | B22C 9/22 249/135 |
| 2013/0320598 A1 | 12/2013 | Atkins | |

FOREIGN PATENT DOCUMENTS

| | | | |
|---|---|---|---|
| DE | 102007029052 A1 | 1/2009 | |
| DE | 102008027315 A1 | 12/2009 | |
| EP | 351030 | 7/1989 | |
| EP | 0431924 A2 | 6/1991 | |
| EP | 0431924 | 7/1991 | |
| EP | 1364728 | 11/2003 | |
| EP | 1464220 | 10/2004 | |
| EP | 2090752 A2 | 8/2009 | |
| EP | 2366517 | 9/2011 | |
| EP | 2422956 | 2/2012 | |
| EP | 2646185 | 10/2013 | |
| EP | 2716390 | 7/2014 | |
| EP | 2910322 | 8/2015 | |
| GB | 419126 | 5/1933 | |
| GB | 2348393 A | 10/2000 | |
| GB | 2467439 A | 9/2010 | |
| JP | 61-78548 | 4/1986 | |
| JP | 61-172665 | 8/1986 | |
| JP | S6283414 | 4/1987 | |
| JP | 61-78548 | 4/1996 | ............ B22C 15/00 |
| JP | 09-201664 | 8/1997 | ............ B22D 24/04 |
| JP | 10-19306 | 7/1998 | |
| JP | 11-156856 | 6/1999 | |
| JP | 2008-149372 | 7/2008 | |
| JP | 2009-255104 | 11/2009 | |
| WO | 2001/056736 A2 | 8/2001 | |
| WO | 2005/025779 | 3/2005 | |
| WO | 2005/032802 | 4/2005 | ............ B29C 67/00 |
| WO | 2006/025883 | 3/2006 | |
| WO | 2007/114895 | 10/2007 | |
| WO | 2007/127899 | 11/2007 | |
| WO | 2007/127899 A2 | 11/2007 | |
| WO | 2007/139938 | 12/2007 | |
| WO | 2008/000938 | 1/2008 | |
| WO | 2008/091793 | 7/2008 | |
| WO | 2008/146698 A1 | 12/2008 | |
| WO | 2008/155021 A2 | 12/2008 | |
| WO | 2009/023226 | 2/2009 | |
| WO | 2009/141152 | 11/2009 | |
| WO | 2010/061174 | 6/2010 | |
| WO | 2011/082152 | 7/2011 | |

OTHER PUBLICATIONS

Office Action received for Canadian Patent Application No. 2819098, dated Mar. 13, 2017; 4 pages.
Office Action received for Canadian Patent Application No. 2819097, dated Mar. 14, 2017; 5 pages.

(56) References Cited

OTHER PUBLICATIONS

Australian Office Action; Application No. 2011335124; 6 pages, dated Aug. 11, 2015.
European Search Report; Application No. 15155032.4; 5 pages, dated Jun. 17, 2015.
Great Britain Office Action; Application No. GB1020233.1; 3 pages, dated Jul. 8, 2015.
Anonymous 3rd Party Submission for Application GB24900987; 4 pages, dated Jun. 9, 2015.
Takahashi, M., et al.; "Fabrication of Tungsten/Copper Graded Material;" Int. J. of Refractory Metals & Hard Materials; pp. 243-250; 8 pages, 1993.
Itoh, Y. et al.; "Design of tungsten/copper graded composite for high heat flux components;" Fusion Engineering and Design; vol. 31, pp. 279-289; 11 pages, 1996.
Stromberger, F. et al.; "Infiltration Processing of Metal-Ceramic FGM's;" Materials Science Forum vols. 208-311, pp. 162-168; 6 pages, 1999.
Cook, A.J. et al.; "Pressure infiltration casting of metal matrix composites;" Materials Science and Engineering; A144, pp. 189-206; 18 pages, 1991.
Mortensen, A.; "On the Infiltration of Metal Matrix Components;" Metallurgical Transations; vol. 18A, pp. 1160-1163; 4 pages, 1987.
Anonymous 3rd Party Submission for Application GB24900987, 4 pages, dated May 11, 2015.
Canadian Office Action; Application No. 2,819,097; 5 pages, dated Jul. 27, 2015.
Australian Office Action; Application No. 2011336236; 4 pages, dated Aug. 19, 2015.
Anonymous 3rd Party Submission for Application GB1020232.2; 4 pages, dated Jul. 10, 2015.
Chua, Chee Kai, et al.; "Rapid Prototyping: Principles and Applications;" 3rd edition textbook, ISBN-13: 9789812778987 & IBSN-10: 9812778985; 22 pages, 2010.
Great Britain Search Report and Office Action; Application No. GB1512705.3; 5 pages, dated Sep. 4, 2015.
Great Britain Office Action; Application No. GB1512705.3; 2 pages, dated Nov. 11, 2015.
Canadian Office Action, Application No. 2819098; 3 pages, dated Jan. 5, 2016.
Observations under Section 21 received from the Great Britain patent office, Application No. 1020234.9; 3 pages, dated Jan. 29, 2016.
Great Britain Office Action, Application No. 1020233.1; 1 page, dated Feb. 22, 2016.
S. Yang et al., "A novel solid freeforming method using simultaneous part and mould construction," Rapid Prototyping Journal, pp. 35-44, 10 pages, 2008.
Anonymous 3rd Party Submission for Application GB24900987; 3 pages, dated Jan. 25, 2016.
B. Utela et al.. "A review of process development steps for new material systems in three dimensiaonl printing (3DP)," Journal of Manufacturing Processes, pp. 96-104; 9 pages, 2008.
Great Britain Office Action, Application No. 1020233.1; 3 pages, dated Feb. 5, 2016.
Great Britain Office Action, Application No. 1020233.1; 3 pages, dated Dec. 14, 2015.
European Office Action, Application No. 11807980.5; 5 pages, dated Nov. 24, 2015.
European Office Action, Application No. 13198927.9; 4 pages, dated May 2, 2016.
European Office Action, Application No. 11799646.2; 4 pages, dated May 2, 2016.
Canadian Office Action; Application No. 2,819,097; 4 pages, dated Apr. 1, 2016.
European Search Report, Application No. 14166168.6; 6 pages, dated Jul. 7, 2016.
European Search Report, Application No. 16163821.8; 6 pages, dated Jul. 19, 2016.
European Office Action; Application No. 11807980.5-1362; 4 pages, dated Jun. 18, 2015.
Canadian Office Action; Application No. 2,819,098; 3 pages, dated Feb. 25, 2015.
European Communication of 3rd Party Observations; EP Appl. No. 11808324.5; 8 pages, dated Apr. 30, 2015.
Lin et al., "The Development of the Heterogeneous Object Design for Rapid Prototyping", Journal of Advanced Manufacturing Systems, vol. 9, No. 1, pp. 49-61, 2010.
Kumar and Kruth, "Composites by Rapid Prototyping Technology", Materials & Design, 23 pages, Jul. 16, 2009.
Knoppers et al., "The Reality of Functionally Graded Material Products", solid Freeform Fabrication Symposium Proceedings 2004, p. 38-48, 2004.
Jackson et al., "Modelling and designing functionally graded material components for fabrication with local composition control", Material and Design, vol. 20, pp. 63-75, 1999.
Mohebi et al., "Computer Generation of Metal Components by Simultaneous Deposition Of Mould, Cores, and Part", Solid Freeform Fabrication Symposium Proceedings 2006, p. 690.
United Kingdom Communication of Thrid Party Observations; Application No. GB1020232.3; 5 pages, dated Apr. 17, 2015.
United Kingdom Communication of Thrid Party Observations; Application No. GB1020233.1; 6 pages, dated Apr. 8, 2015.
Yang et al., "A novel solid freeforming method using simultaneous part and mould construction", Rapid Prototyping Journal, pp. 35-43, 2008.
Dimitrov et al., "Advances in Three Dimensional Printing—State of the Art and Future Perspectives", Journal for New Generation Sciences, vol. 4, No. 1, pp. 21-49, 2006.
Rock et al., "Freeform Powder Molding: From CAD Model to Part Without Tooling", Int. J. Powder Metallurgy, vol. 33, n2:s. 37-44, 1997.
European Communication of Third Party Observations; Application No. 11799646-1362; 5 pages, dated Apr. 8, 2015.
Canadian Office Action; Application No. 2,819,097; 4 pages, dated Dec. 18, 2014.
Australian Office Action; Application No. 2011336249; 3 pages, dated Mar. 6, 2015.
Great Britain Office Action; Application No. GB1020233.1; 3 pages, dated Feb. 18, 2015.
Great Britain Office Action; Application No. GB1020232.3; 4 pages, dated Feb. 24, 2015.
European Office Action issued in EP Appl. No. 11799646.2-1362, 5 pages, dated Nov. 27, 2014.
Australian Office Action issued in AU Appl. No. 2011336236, 3 pages, dated Dec. 5, 2014.
Australian Office Action issued in AU Appl. No. 2011336246, 2 pages, dated Dec. 4, 2014.
Canadian Office Action; Application No. 2,819,098; 2 pages, dated Jul. 9, 2014.
GB Search Report under Section 17(5); Application No. GB1020235.6; pp. 4, dated Sep. 26, 2011.
Canadian Office Action; Application No. 2,819,097; pp. 3, dated Feb. 28, 2014.
Extended European Search Report; Application No. 13198927.9-1362; pp. 6, dated Jun. 30, 2014.
International Search Report and Written Opinion, Application No. PCT/IB2011/002815, 10 pages, dated Mar. 19, 2012.
International Search Report and Written Opinion, Application No. PCT/EP201 1/071038, 13 pages, dated Feb. 8, 2013.
International Search Report and Written Opinion, Application No. PCT/IB2011/002891, 9 pages, dated Sep. 19, 2012.
International Preliminary Report on Patentability, Application No. PCT/IB2011/002891, 7 pages, dated Mar. 12, 2013.
International Search Report and Written Opinion, Application No. PCT/IB2011/002885, 14 pages, dated Oct. 15, 2012.
International Preliminary Report on Patentability, Application No. PCT/EP2011/071038, 10 pages, dated Jun. 13, 2013.
International Preliminary Report on Patentability, Application No. PCT/IB2011/002885, 12 pages, dated Jun. 13, 2013.
International Preliminary Report on Patentability, Application No. PCT/IB2011/002815, 7 pages, dated Jun. 13, 2013.

(56) References Cited

OTHER PUBLICATIONS

GB Search Report under Section 17(5); Application No. GB1020233.1; pp. 4, dated Sep. 28, 2011.
GB Search Report under Section 17(6); Application No. GB1020233.1; pp. 3, dated Sep. 19, 2012.
GB Search Report under Section 17(6); Application No. GB1020235.6; pp. 2, dated Mar. 19, 2012.
Second GB Search Report under Section 17(6); Application No. GB 1020235.6; pp. 2, dated Mar. 19, 2012.
GB Search Report under Section 17(5); Application No. GB1020234.9; pp. 5, dated Oct. 10, 2011.
GB Search Report under Section 17(6); Application No. GB1020234.9; pp. 3, dated Sep. 21, 2012.
GB Search Report under Section 17(5); Application No. GB1020232.3; pp. 6, dated May 3, 2011.
GB Search Report under Section 17(6); Application No. GB1020232.3; pp. 3, dated Oct. 13, 2011.
Siu, Yan Kit, Sooi Thor Tan. "Modeling the material grading and structures of heterogeneous objects for layered manufacturing." Computer-Aided Design 34.10 (2002): 705-716; 12 pages.
Fessler, J. R., et al. "Laser deposition of metals for shape deposition manufacturing." Proceedings of the solid freeform fabrication symposium. Austin, TX: University of Texas at Austin, 1996; 8 pages.
Fessler, J., et al. "Functional gradient metallic prototypes through shape deposition manufacturing." Proceedings of the solid freeform fabrication symposium. 1997; 8 pages.
Bourell, D. L., and J. J. Beaman Jr. Solid Freeform Fabrication Proceedings. Texas Univ at Austin Dept of Mechanical Engineering, Sep. 1996; 6 pages.
Office Action received for Great Britain Patent Application No. GB1020235.6, dated Jan. 31, 2018; 2 pages.

\* cited by examiner

HEAT FLOW CONTROL FOR MOLDING DOWNHOLE EQUIPMENT

RELATED APPLICATION

This application is a Divisional Application of U.S. patent application Ser. No. 13/990,308 filed Mar. 29, 2013, which is a U.S. National Stage Application of International Application No. PCT/EP2011/071038 filed Nov. 25, 2011, which designates the U.S. and claims the benefit of Great Britain Application No. 1020235.6 filed Nov. 29, 2010, which are incorporated herein by reference in their entirety.

TECHNICAL FIELD

The present invention relates to methods of designing, printing and/or manufacturing a mold or mold assembly or a related unitary body, to the mold or mold assembly or related unitary body so designed, printed and/or manufactured, and to molded objects molded using such a mold or mold assembly or related unitary body. embodiments of the invention may be concerned with the use of printed bodies formed by 3D printing, which bodies constitute or include molds, which may form part of a mold assembly for molding or casting downhole equipment or components thereof.

BACKGROUND OF THE DISCLOSURE

Rotary drill bits are frequently used to drill oil and gas wells, geothermal wells and water wells. Rotary drill bits may be generally classified as rotary cone or roller cone drill bits and fixed cutter drilling equipment or drag bits. Fixed cutter drill bits or drag bits are often formed with a bit body having cutting elements or inserts disposed at select locations or exterior portions of the bit body. Fluid flow passageways are typically formed in the bit body to allow communication of drilling fluids from associated surface drilling equipment through a drill string or drill pipe attached to the bit body.

Fixed cutter drill bits generally include a metal shank operable for engagement with a drill string or drill pipe. Various types of steel alloys may be used to form a metal shank. A bit head may be attached to an associated shank to form a resulting bit body.

For some application a bit head may be formed from various types of steel alloys satisfactory for use in drilling a wellbore through a downhole formation. The resulting bit body may sometimes be described as a "steel bit body." For other applications, a bit head may be formed by molding hard, refractory materials with a metal blank. A steel shank may be attached to the metal blank. The resulting bit body may be described as a "matrix bit body." Fixed cutter drill bits or drag bits formed with matrix bit bodies may sometimes be referred to as "matrix drill bits."

Various techniques have previously been used to form molds associated with fabrication of matrix bit bodies and/or steel bit bodies for fixed cutter drill bits. For example numerically controlled machines and/or manual machining processes have been used to fabricate molds from various types of raw material blanks. For example, graphite based materials in the form of solid, cylindrical blanks have been machined to form a mold cavity with dimensions and configurations that represent a negative image of a bit head for an associated matrix drill bit.

Matrix drill bits are often, formed by placing loose infiltration material or matrix material (sometimes referred to as "matrix powder") into a mold and infiltrating the matrix material with a binder such as a copper alloy. Other metallic alloys may also be used as a binder. Infiltration materials may include various refractory materials. A preformed metal blank or bit blank may also be placed in the mold to provide reinforcement for a resulting matrix bit head. The mold may be formed by milling a block of material such as graphite to define a mold cavity with features corresponding generally with desired exterior features of a resulting matrix drill bit.

Various features of a resulting matrix drill bit such as blades, cutter pockets, and/or fluid flow passageways may be provided by shaping the mold cavity and/or by positioning temporary displacement material within interior portions of the mold cavity. As associated metal shank may be attached to the bit blank after the matrix bit head has been removed from the mold. The metal shank may be used to attach of the resulting matrix drill bit with a drill string.

A wide variety of molds has been used to form matrix bit bodies and associated matrix drill bits. U.S. Pat. No. 5,373,907 entitled "Method And Apparatus For Manufacturing And Inspecting The Quality Of A Matrix Body Drill Bit" shows some details concerning conventional mold assemblies and matrix bit bodies.

A wide variety of molds and castings produced by such molds have been used to form steel bit bodies and associated fixed cutter drill bits.

More recently, three dimensional (3D) printing equipment and techniques have been used in combination with three dimensional (3D) design data associated with a wide variety of well drilling equipment and well completion equipment to form molds for producing various components associated with such equipment. For some applications refractory materials, infiltration materials and/or matrix materials, typically in a powder form, may be placed in such molds. For other applications molten steel alloys or other molten metal alloys may be poured into such molds.

A wide variety of equipment and procedures have been developed to form models, molds and prototypes using automated layering devices. U.S. Pat. No. 6,353,771 entitled "Rapid manufacturing Of Molds For Forming Drill Bits" provides examples of such equipment and procedures.

Various techniques and procedures have also been developed to use three dimensional (3D) printers to form models, molds and prototypes using 3D design data. See, for example, information available at the websites of Z Corporation (www.zcorp.com); Prometal, a division of The Ex One Company (www.prometal.com); EOS GmbH (www.eos.info); and 3D Systems, Inc. (www.3dsystems.com); and Stratasys, Inc. (www.stretasys.com) and www.dimensionprinting.com).

U.S. Pat. No. 5,204,055 entitled 3-Dimensional Printing techniques and Related Patents discusses various techniques such as ink jet printing to deposit thin layers of material and inject binder material to bond each layer of powder material. Such techniques have been used to "print" molds satisfactory for metal casting of relatively complex configurations. U.S. Pat. No. 7,070,734 entitled "Blended Powder Solid-Supersolidus Liquid Phase Sentencing" and U.S. Pat. No. 7,087,109 entitled "Three Dimensional Printing Material System and Method" also disclose various features of 3D printing equipment which may be used with 3D design data. Another technique for 3D printing is known as Selective Laser Sintering (SLS). Details of one such application of this technique and related equipment are disclosed in U.S. Pat. No. 5,147,587 A.

It is in general important to control both heating and cooling of matrix materials or cooling of molten metal alloys to provide optimum fracture resistance (toughness), optimum tensile strength and/or optimum erosion, abrasion and/or wear resistance of resulting components, and to avoid molding or casting defects.

For example, by suing three dimensional (3D) printing equipment and techniques, three dimensional (3D) computer aided design (CAD) data associated with fixed cutter drill bits may be used to produce respective molds each having a mold cavity that is essentially a "negative image" of various portions of each fixed cutter drill bit. Such molds may be used to form a matrix bit head or a steel bit head for a respective fixed cutter drill bit. U.S. Pat. No. 6,296,069 entitled "Bladed Drill Bit with Centrally Distributed Diamond Cutters" and U.S. Pat. No. 6,302,224 entitled "Drag-Bit Drilling with Multiaxial Tooth Inserts" show various examples of blades and/or cutting elements which may be used with a matrix bit body. Various components of other well tools may also be molded as matrix bodies.

In this regard, U.S. Patent Application Publication No. 2007/0277651 A1, to Calnan et al., entitled "molds and Methods of Forming Molds Associated With Manufacture of Rotary Drill Bits and Other Downhole Tools", proposes using 3D printing equipment in combination with 3D design data to form respective portions of a mold from materials having different thermal conductivity and/or electrical conductivity characteristics.

In particular, Calnan et al. contemplate that providing high thermal conductivity proximate a first end or bottom portion of a mold may improve heat transfer during heating and cooling of materials disposed within the mold. Thermal conductivity may be relatively low proximate a second end or top portion of the mold, so that that portion of the mold will function as an insulator for better control of heating and/or cooling of materials disposed within the mold. Specifically, Calnan et al. envision that, for some applications, two or more layers of sand or other materials with different heat transfer characteristics may be used to form molds. It is to be understood that the two or more layers in question are two or more of the same horizontal layers of mold material which are sequentially deposited and built up in the 3D printing process by which the mold is formed.

Calnan et al. further propose to form a mold having variations in electrical conductivity to accommodate varying heating and/or cooling rates of materials disposed within the mold. For example, one or more portions to the mold may be formed from materials having electrical conductivity characteristics compatible with an associated microwave heating system or an induction heating system. As a result, such portions of the mold may be tested to a higher temperature and/or heated at a higher rate than other portions of the mold which do not have such electrical conductivity characteristics.

Furthermore, Calnan et al. contemplate placing degassing channels within a mold to allow degassing or off gassing of materials disposed within the mold, as well as providing fluid flow channels on interior and/or exterior portions of a mold to heat and/or cool materials disposed within the mold. Various types of liquids and/or gases may be circulated through such fluid flow channels.

SUMMARY OF THE INVENTION

According to a first aspect of the present invention, there is provided a method of designing a mold, the mold being at least part of a unitary body to be formed from a plurality of layers by 3D printing, the method comprising: defining an inner surface of the mold corresponding to at least part of an outer surface of an object to be molded in the mold; selecting a first material from which at least part of the mold is to be printed; and selecting a second materiel from which at least another part of the mold is to be printed, the second material having a higher thermal and/or electrical conductivity than the first material, wherein at least one of the layers from which the mold is to be formed by 3D printing includes areas to be printed from each of the first and second materials.

In one embodiment the method further comprises: defining an outer surface or the mold corresponding at least in part to a inner surface of a container in which the mold may be installed as part of a mold assembly, the outer surface of the mold being defined so as to minimize the thickness of the mold between the inner surface and the outer surface of one at more parts of the mold whilst the mold and molded object remain removable from the container after molding the object. In this embodiment, the thickness of the mold may be minimized whilst further maintaining a minimum strength of the mold as is required for handling the mold and for molding the object without breaking.

In another embodiment of the method, the material for each part of the mold may be selected based on a likelihood of molding defects occurring at related positions within the material from which the object is to be molded, during molding of the object.

In a further embodiment, the material for each part of the mold may be selected by initially designing the mold to be formed entirely of the first material or entirely of the second manorial, and then substituting that material with the second material or the first material, respectively, in one or more parts in order to increase or decrease, respectively, the thermal conductivity of the mold in those one or more parts. In this further embodiment, the one or more parts where the respective material is to be substituted in order to increase or decrease the thermal conductivity of the mold in those one or more parts is determined based, at least in part, on a likelihood of molding defects occurring in the material from which the object is to be molded in related parts of the mold cavity during molding of the object.

In embodiments of the first aspect of the invention, the second material may be excitable by electromagnetic radiation to generate heat and thereby to act as a heat source.

In embodiments of the first aspect of the invention, the mold may be initially designed to be formed entirely of the first material, and then one or more parts of the mold re-designed to be formed of said second materiel in order to control the distribution of temperature and/or the direction of heat flow through the mold during molding of the object.

In further embodiments of the first aspect of the invention, the material for each part of the mold may be selected, at least an part, based on the heat flow properties of the material or materials from which the object is to be molded.

The object to be molded in the embodiments of the first aspect of the invention may be an object selected from the list including: a steel bit head; a matrix bit head; a drill bit; and a piece or component of downhole equipment.

According to a second aspect of the present invention, there is provided a unitary body formed from a plurality of layers by 3D printing, the body comprising a mold, wherein: the mold defines an internal surface corresponding to at least part of an external surface of an object to be molded in the mold; at least a part or the mold is printed from a first material; at least another part of the mold is printed from a second material, the second material having a higher thermal and/or electrical conductivity than the first material; and at least one of the layers from which the mold is formed by 3D printing includes areas printed from each or the first and second materials.

In embodiments of the unitary body, the mold may define an outer surface corresponding at least in part to an inner surface of a container in which the mold may be installed as part of a mold assembly, one or more parts of the mold having a thickness between the inner and outer walls that is minimized whilst still permitting the mold and molded object to remain removable from the container after molding the object.

In embodiments of the unitary body of the second aspect of the invention, the second material is incorporated in parts of the mold where increased heat flow into or out of the material from which the object is to be molded is desired in order control the attraction of heating and/or cooling and/or solidification of the material from which the object is to be molded.

In further embodiments of the unitary body of the second aspect of the invention, the second material is excitable by electromagnetic radiation to generate hear and thereby to ac as a heat source.

In yet further embodiment of the unitary body of the second aspect of the invention, the object to be molded may be an object selected from the list including: a steel bit head; a matrix bit head; a drill bit; and a piece or component of downhole equipment.

According to a third aspect of the present invention, there is provided a method of printing a unitary body from a plurality of layers by 3D printing, the body comprising a mold having an internal surface corresponding to at least part of an external surface of an object to be molded in the mold, the method comprising depositing and bonding in selected areas a plurality of layers of materials to form the body, wherein: the materials include a first mold material from which at least part of the mold is to be printed and a second mold material from which at least another part of the mold is to be printed, the second mold material having a higher thermal and/or electrical conductivity that the first mold material; and at least one of the layers from which the body is formed by 3D printing includes areas in the layer to be printed from each of the first and second materials.

In embodiments of the method of the third aspect of the invention, the materials from which the body is formed are selectively deposited in specified areas in each layer.

In further embodiments of the method of the third aspect of the invention, the materials from which the body is formed are selectively bonded in a specified areas in each layer.

In still further embodiments of the method of the third aspect of the invention, the object to be molded is an object selected from the list including: a steel bit head; a matrix bit head; a drill bit; and a piece or component of downhole equipment.

According to a fourth aspect of the present invention, there is provided a method of designing a mold assembly including a container and a mold, at least portions of an outer surface of the mold corresponding to an inner surface of the container such that the container will support the mold therein, in use of the mold for molding an object, the mold assembly defining a mold cavity substantially corresponding to the outer shape of the object to be molded, the method including: specifying at least one material from which the mold is to be formed from a plurality of layers by 3D printing; and specifying at least another material to be positioned in at least part of a space inside the container which is a defined by the mold and is separate from the mold cavity, the other material having a thermal and/or electrical conductivity different from that of the one material, to adjust the heat flow through the mold at the position adjacent said another material during molding of the object.

In embodiments of the method of the fourth aspect of the invention, the space is between the mold and the inside of the container.

In further embodiments of the fourth aspect of the invention, the at least another material is positioned in a space created by a displacement that forms part of the mold, the displacement defining a negative image of at least part of a recessed portion of the object to be molded, wherein the method includes at least partially minimizing the wall thickness of the displacement so as to form the space between the outer wall of the mold and the inner wall of the container.

In alternative embodiments of the fourth aspect of the invention, the mold includes an elongated displacement inside the mold cavity to define a fluid passageway through the object to be molded, with the space being defined inside the elongate displacement.

In yet further embodiments of the fourth aspect or the invention, the space provides a flow channel through which heating or cooling fluids may be passed to control heat flow through the material from which an object is to be molded in the mold.

In still further embodiments of the fourth aspect of the invention, the at least another material is positioned in contact with the mold in parts of the mold assembly where increased heat flow through the mold is desired in order to control the direction of heating and/or cooling and/or solidification of the material from which the object is to be molded.

In embodiments of the fourth aspect of the invention, the at least another material may form part of a heat source for selectively supplying heat to the mold assembly. In this case, the at least another material may be excitable by electromagnetic radiation to generate heat and thereby to act as a heat source.

In the method of the fourth aspect of the invention, the material for each part of the mold assembly may be selected based on the material or materials from which the object is to be molded.

In further embodiments of the method of the fourth aspect of the invention, the material for each part of the mold assembly is selected based on a likelihood of molding defects occurring in the material from which the object is to be molded in related parts of the mold cavity during molding of the object.

Still further embodiments of the fourth aspect of the invention include minimizing the thickness of the mold whilst ensuring that the mold and molded object remain removable from the container after molding the object, such that the container can be used more than once for molding an object. In these still further embodiments, the thickness of the mold is minimized whilst further maintaining a minimum strength of the mold as is required for handling the mold for assembling the mold assembly and for molding the object without breaking.

In embodiments of the fourth aspect of the present invention, the object to be molded may be an object selected from the list including: a steel bit head; a matrix bit head; a drill bit; and a piece or component of downhole equipment.

According to a fifth aspect of the present invention, there is provided a mold assembly including a container and a mold, at least portions of an outer surface of the mold corresponding to an inner surface of the container such that the container supports the mold therein for molding an object, the mold assembly defining a mold cavity substantially corresponding to the outer shape of the object to be molded, wherein: the mold is formed from a plurality of layers of at least one material by 3D printing; and at least another material is positioned in at least part of a space inside the container which is defined by the mold and is separate from the mold cavity, the other material having a thermal and/or electrical conductivity different from that of the one material.

In embodiments of the mold assembly of the fifth aspect, the space is between the mold and the inside of the container. In this case, the at least another material may be positioned in a space created by a displacement that forms part of the mold, the displacement defining a negative image of at least part of a recessed portion of the object to be molded, wherein the wall thickness of the displacement is at least partially minimized so as to form the space between the outer wall of the mold and the inner wall of the container.

Further embodiments of the mold assembly of the fifth aspect of the invention may include an elongate displacement inside the mold cavity to define a fluid passageway through the object to be molded, the space being defined inside the elongate displacement and having therein the at least another material having a thermal and/or electrical conductivity different from that of the at least one material from which the mold is to be printed.

In embodiments of the mold assembly of the fifth aspect of the invention, the thickness of the mold is at least partially minimized whilst ensuring that the mold and molded object remain removable from one container after molding the object.

In further embodiment of the mold assembly of the fifth aspect of the invention, the at least another material forms part of a heat source for selectively supplying heat to the mold assembly. In this case, the at least another material may be excitable by electromagnetic radiation to generate heat and thereby to act as a heat source.

In still further embodiments of the mold assembly of the fifth aspect of the present invention, the at least another maternal is positioned in contact with the mold.

In yet further embodiments of the mold assembly of the fifth aspect of the present invention, the object to be molded is an object selected from the list including: a steel bit head; a matrix bit head; a drill bit; and a piece or component of downhole equipment.

According to a sixth aspect of the present invention, there is provided a method of manufacturing a mold assembly including a container and a mold, at least portions of an outer surface of the mold corresponding to an inner surface of the container such that the container will support the mold therein, in use of the mold for molding an object, the mold assembly defining a mold cavity substantially corresponding to the outer shape of the object to be molded, the method including: installing in the container (i) a mold formed from a plurality of layers of at least one material by 3D printing and (ii) at least another material positioned in a space defined by the mold inside the container, wherein the other material has a thermal and/or electrical conductivity different from that of the one material.

In embodiments of the sixth aspect of the invention, the mold a includes at least one elongate displacement which is installed inside the mold cavity to define a fluid passageway through the object to be molded, the space being defined inside the elongate displacement and having therein the at least another material having a thermal and/or electrical conductivity different from that of the at least one material from which the mold is to be printed.

According to a seventh aspect of the present invention, there is provided a method of molding an object including heating and/or cooling a body of material in a mold assembly, the method including controlling the heating and/or cooling of the body of material by selectively supplying heat from a heat source disposed within the mold assembly.

In embodiment of the method of the seventh aspect of the invention, the mold assembly includes a mold and the heat source is disposed in the mold or in a space substantially defined by the mold.

In further embodiments of the method of the seventh aspect of the invention, selectively supplying heat includes (directly or indirectly) selectively controlling the rate at which heat is supplied by the heat source and/or selectively supplying heat for certain time periods also not supplying heat for other time periods, during the heating and/or cooling of the body.

In still further embodiments of the seventh aspect of the invention, heat is supplied from the heat source by exciting the heat source by applying an electromagnetic field.

In yet further embodiments of the seventh aspect of the invention, the heat source includes an element selected from the list including: a thermally conductive channel for conducting heat into the mold assembly from a hotter region outside the mold assembly; an induction heating element; a glow bar; and a bar heater.

In even further embodiments of the seventh aspect of the invention, the heat source is disposed in a displacement that extends into and/or through the mold cavity.

According to an eighth aspect of the present invention, there is provided a method of molding an object including heating and/or cooling a body of material in a mold designed according to the method of the first aspect of the present invention.

According to a ninth aspect of the present invention, there is provided a method of molding as object including heating and/or cooling a body of material in a mold assembly including the unitary body of the second aspect of the present invention.

According to a tenth aspect of the present invention, there is provided a method of molding an object including heating and/or cooling a body of material in a mold assembly including a unitary body designed by the method of the third aspect of the present invention.

According to an eleventh aspect of the present invention, there is provided a method of molding an object including heating and/or cooling a body of material in a mold assembly designed according to the method of the fourth aspect of the present invention.

According to a twelfth aspect of the present invention, there is provided a method of molding an object including heating and/or cooling a body of material in a mold assembly according to the fifth aspect of the present invention.

According to a thirteenth aspect of the present invention, there is provided a heating device including a heat source for use in molding an object in a mold assembly, the heat source being disposed within a displacement forming part of the mold assembly for forming a recess is or flow passage through the object to be mold.

In embodiments of the heating device of the thirteenth aspect of the invention, the displacement is formed from consolidated sand.

According to a fourteenth aspect of the present invention, there is provided an object molded using the heating devices of the thirteenth aspect of the present invention.

According to a fifteenth aspect of the present invention, there is provided a method of molding an object comprising heating and/or cooling material from which the object is to be formed in a mold assembly that includes the heating device of the thirteenth aspect of the present invention, wherein the method includes controlling the heating and/or cooling, at least in part, by supplying heat to the mold assembly with the hearing device.

BRIEF DESCRIPTION OF THE DRAWINGS

To enable a better understanding of the present invention, and to show how the same may be carried into effect, reference will now be made, by way of example only, to the accompanying drawings, in which.

DETAILED DESCRIPTION

Figure 1:
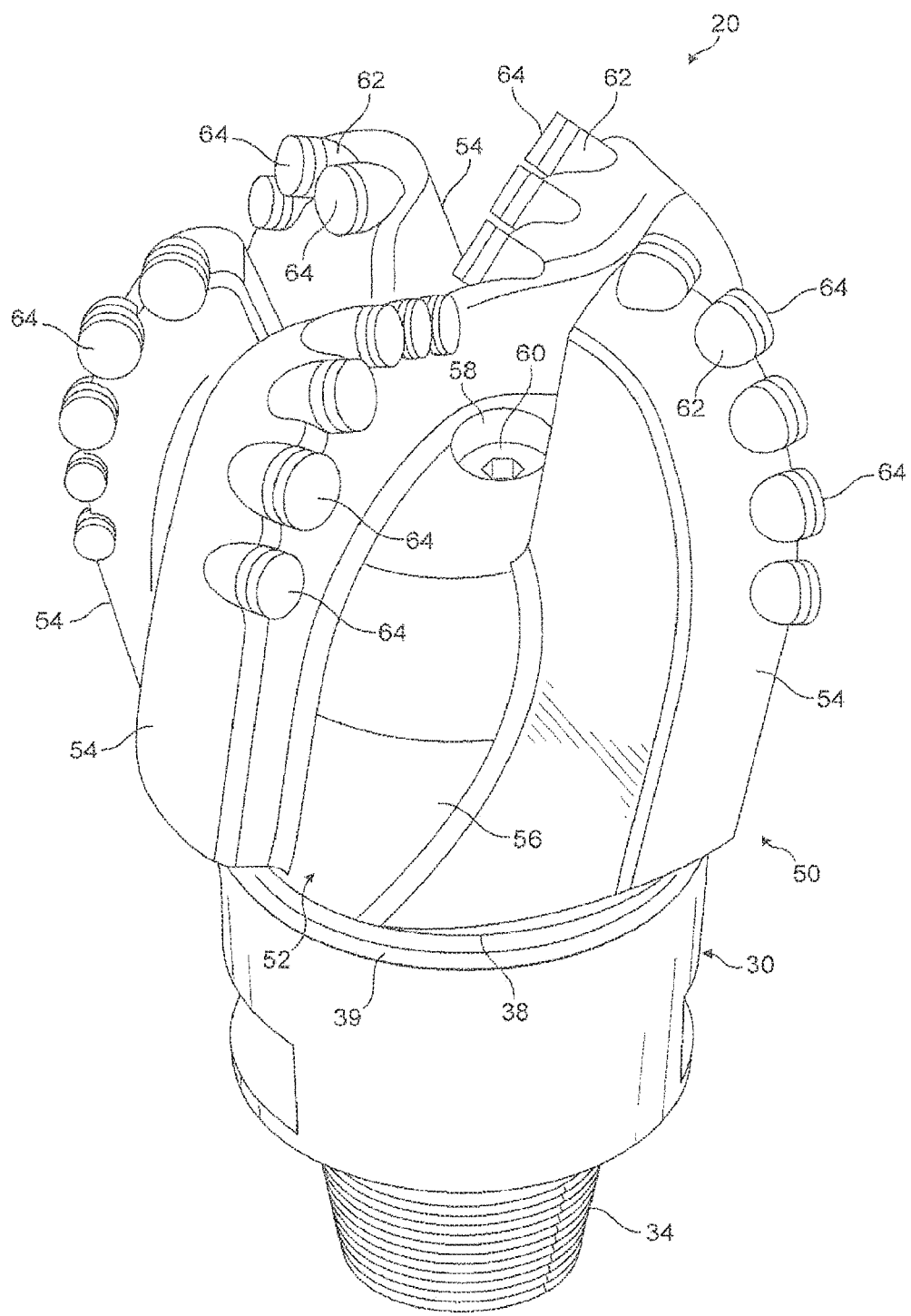
FIG. 1 is a schematic drawing showing a perspective view of a fixed cutter drill bit.

Exemplary embodiments of the present invention, and advantages obtainable therewith, will be described hereinbelow with reference to FIGS. 1-8, in which like numbers refer to same and like parts.

Various features and steps of ore present disclosure may be described with respect to forming a bit body for a rotary drill bit. Portions of the bit body formed in a mold may be referred to as a "bit head." For some embodiments a "bit body" may generally be described as a bit head with a metal shank attached thereto. Some prior art references may refer to a bit head (as used in this application) as a bit body. Some bit bodies may be formed with an integral bit head and metal shank in accordance with teachings of the present of disclosure.

For purposes of describing various features and steps of the present disclosure, the terms "downhole tool" and "downhole tools" may be used to describe well drilling equipment, well drilling tools, well completion equipment, well completion tools and/or associated components which may be manufactured using molds formed in accordance with teachings of the present disclosure. Examples of such well completion tools and/or associated components (not expressly shown) which may be formed at least in part using methods and equipment in accordance with the present disclosure may include, but are not limited to, whipstocks, production packer components, float equipment, casing shoes, casing shoes with cutting structures, well screen bodies and connectors, gas lift mandrels, downhole tractors for pulling coiled tubing, tool joints, wired (electrical and/or fiber optic) tool joints, drill in well screens, rotors, stator and/or housings for downhole motors, blades and/or housings for downhole turbines, latches for downhole tools, downhole wireline service tools and other downhole tools have complex configurations and/or asymmetric geometries associated with competing a wellbore. Molds incorporating teachings of the presort disclosure may be used to form elastomeric and/or rubber components for such well completion tools. Various well completion tools and/or components may also be formed in accordance with teaching of the present disclosure.

A mold, filled with at least one matrix material and at least one infiltration material (also called a binder), may be heated and cooled to form a matrix bit head. For some applications two or more different types of matrix materials or powders may be disposed in the mold. A resulting drill bit may sometimes be referred to as a matrix drill bit.

Various infiltration (binder) materials are known including, but not limited to, metallic alloys of copper (Cu), nickel (Ni), magnesium (Mn), lead (Pb), tin (Sn), cobalt (Co) and silver (Ag) . Phosphorus (P) may sometimes be added in small quantities to reduce the liquidity temperature of infiltration materials disposed in a mold. Various mixtures of such metallic alloys may also be used.

Similarly, different matrix materials, which may sometimes be referred to as refractory materials, are also known. Examples of such matrix materials may include, but art not limited to, tungsten carbide, monotungsten carbide (WC), ditungsten carbide (W2C), macrocrystalline tungsten carbide, other metal carbides, metal borides, metal oxides, metal nitrides, natural and synthetic diamond, and polycrystalline diamond (PCD). Examples of other metal carbides may include, but are not limited to, titanium carbide and tantalum carbide. Various mixtures of such materials may also be used.

Examples of well drilling tools and associated components (not expressly shown) which may be formed at least in part by molds incorporating the teachings of the present disclosure may include, but are not limited to, non-retrievable drilling components, aluminum drill bit bodies associated with casing drilling of wellbores, drill string stabilizers, cones for roller cone drill bits, models for forging dyes used to fabricate support arms for roller cone drill bits, arms for fixed reamers, arms for expandable reamers, internal components associated with expandable reamers, sleeves attached to an up hole end of a rotary drill bit, rotary steering tools, logging while drilling tools, measurement while drilling tools, side wall coring tools, fishing spears, washover tools, rotors, stators and/or housing for downhole drilling motors, blades and housings for downhole turbines, and other downhole tools having complex configurations and/or asymmetric geometries associated with forming a wellbore. The molds disclosed herein may be used to form elastomeric and/or rubber components for such well drilling tools.

In the following descriptor, the terms "downhole tool" and "downhole tools" may also be used to describe well drilling equipment, well drilling tools, well completion equipment, well completion tools and/or associated components.

As used herein, the term "heat flow properties" refers generally to the materials properties affecting the transfer and flow of heat energy through a material or across a thermal boundary, such as thermal conductivity and specific heat capacity, as wall as, in certain instances, melting/freezing and evaporation/condensation points, as well as other materials phase changes, regardless of whether such properties are specifically assessed or are assessed indirectly or qualitatively by analysis of some related or proportional measure.

FIG. 1 shows an example of a fixed cutter drill bit 20 having a plurality of cutter blades 54 arranged around the circumference of a bit head 52. The bit bead 52 is connected to a shank 30 to form a bit body 50. Shank 30 may be connected to the bit head 52 by welding, for example by using laser arc welding to form a weld 39 around a weld groove 38, as shown. Shank 30 includes or is in turn connected to a threaded pin 34, such as an American Petroleum Institute (API) drill pipe thread. In this example, there are five cutter blades 54, in which pockets or recesses 62, otherwise called "sockets" and "receptacles", are formed. Cutting elements 64, otherwise known as inserts, are fixedly installed in each pocket 62, for example by brazing. As the drill bit 20 is rotated in use, it is the cutting elements 64 that come into contact with the formation, in order to dig, scrape or gouge away the material of the formation being drilled. During drilling, drilling mud is pumped downhole, through a drill string (not shown) on which one drill bit 20 would be supported, and out of nozzles 60 disposed in nozzle openings 59 in the bit head 52. Formed between each adjacent pair of cutter blades 54 are junk slots 56, along which cuttings, downhole debris, formation fluids and drilling fluid, etc., may pass, to be returned to the wall surface along an annulus formed between exterior portions of the drill string and the interior of the wellbore being drilled (not expressly shown).

Figure 2:
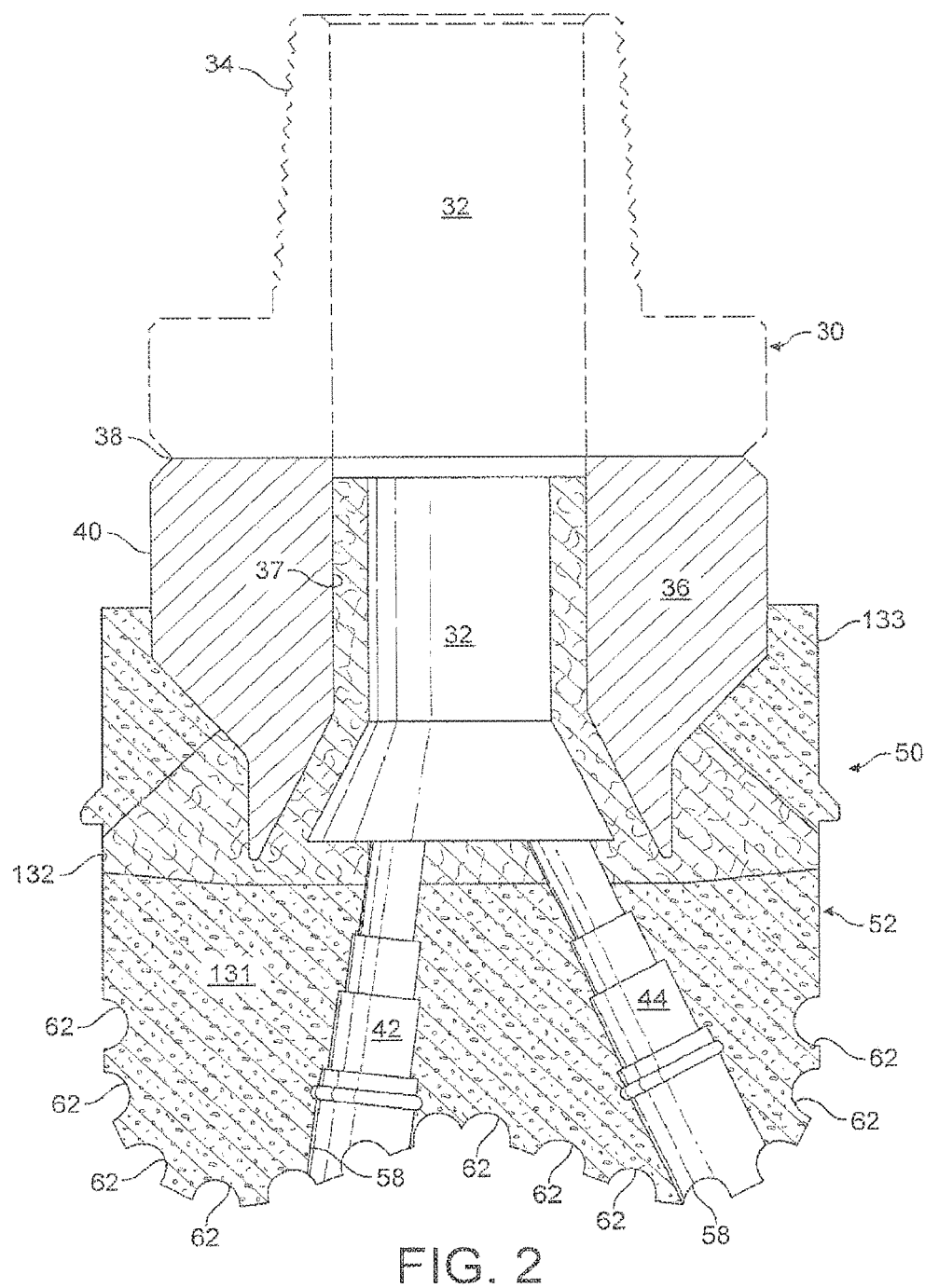
FIG. 2 is a schematic drawing showing a cross-sectional view through the drill bit of FIG. 1.

One drill bit 20 of FIG. 1 is formed an a matrix drill bit, having a matrix bit head 52 as part of matrix bit body 50. FIG. 2 shows, schematically, a cross-section through a drill bit of similar construction, and in particular indicates how the matrix bit head 52 is formed from a plurality of different matrix materials. The matrix bit head 52 is formed about a generally hollow, cylindrical metal blank 36, the metal blank 36 typically being steel.

A first matrix material 131 is chosen for its fracture resistance characteristics (toughness) and erosion, abrasion and wear resistance. First matrix material 131 forms a first zone or layer which corresponds approximately with the exterior portions of composite matrix bit body 50 that contact and remove formation materials during drilling of a wellbore, A second matrix material 132 forms an annulus inside the inner diameter 37 of metal blank 36 to form a fluid flow passage 32 that is connected via further flow passages 42 and 44 to respective nozzle openings 58, Second matrix material 132 may be primarily used to form interior portions of matrix bit body 50 and exterior portions or matrix bit body 50 which typically do not contact adjacent downhole formation materials while forming a wellbore. Second matrix material 132 may also be selected to provide a superior connection to the metal blank 36 than the connections formed between the metal blank 36 and first matrix material 131 what these are in direct contact.

For some applications, a third matrix material 133 may be used to surround an outside diameter 40 of the metal blank 36. Third matrix material 133 is selected so that it may be subsequently machined to provide a desired exterior configuration and transition between matrix bit head 52 and metal shank 36. Of coarse, the foregoing relates only to one possible distribution of three matrix materials, and it should be understood that any number of different matrix materials may in principle be used in the matrix bit head, including only one or two matrix materials or four or more matrix materials.

As shown in dashed lines, the shank 30 can be welded to the metal blank 36 to form matrix bit body 50 after the matrix bit head has been molded onto the metal blank 36, thereby avoiding heat-cycling and deterioration of the materials properties of the shank 36 during heating and cooling of the mold. As shown, the fluid flow passage 32 extends through shank 30 as well as through the metal blank 36.

Figure 3:
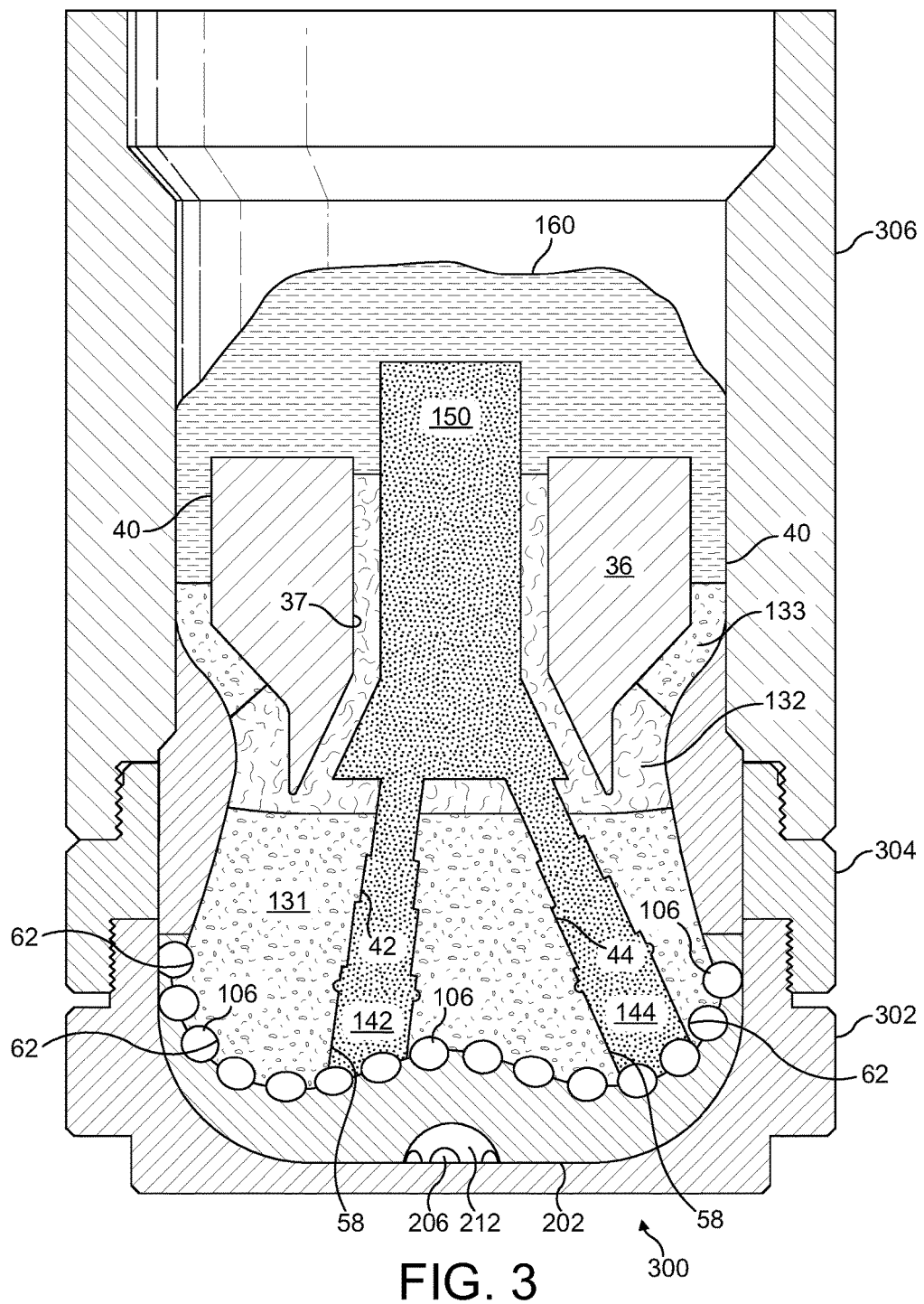
FIG. 3 is a schematic drawing showing a cross-sectional view through a mold assembly that may be heated and cooled to mold the fixed cutter drill bit of FIGS. 1 and 2.
Figure 4:
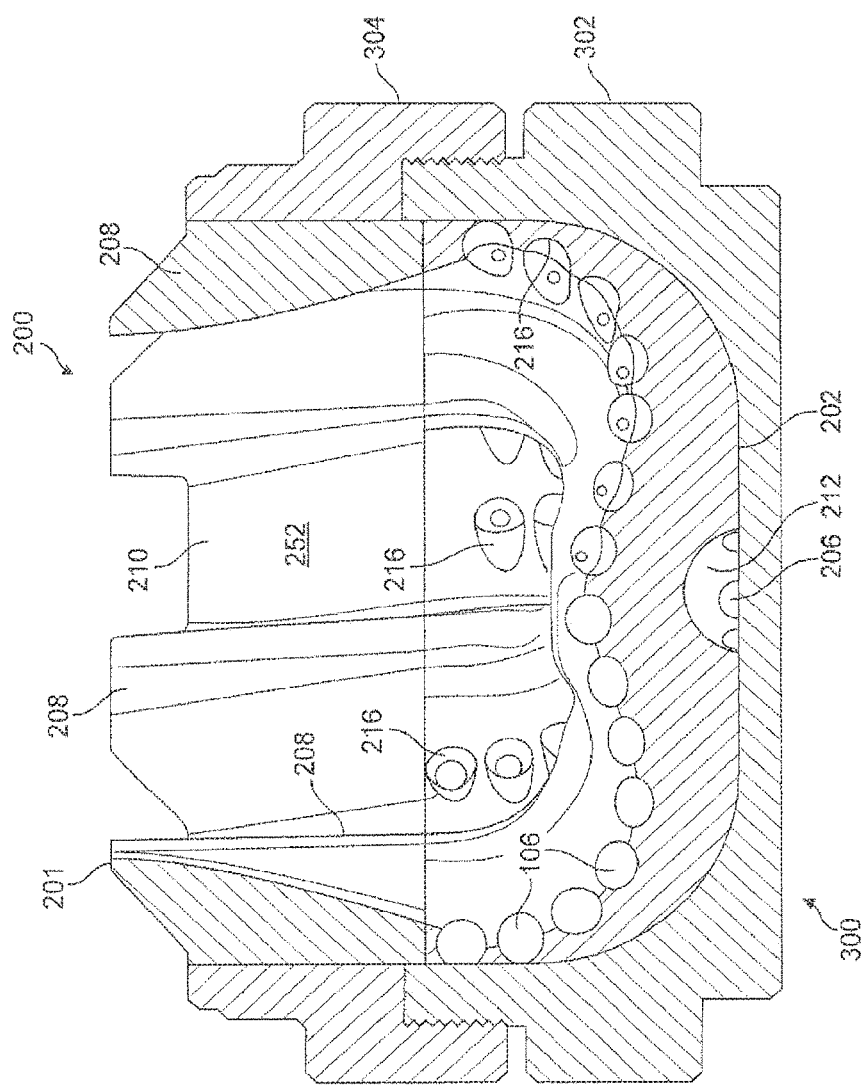
FIG. 4 is a schematic drawing showing a partial cross-sectional view through the lower portion of the mold and container of the mold assembly shown in FIG. 3.
Figure 5A:
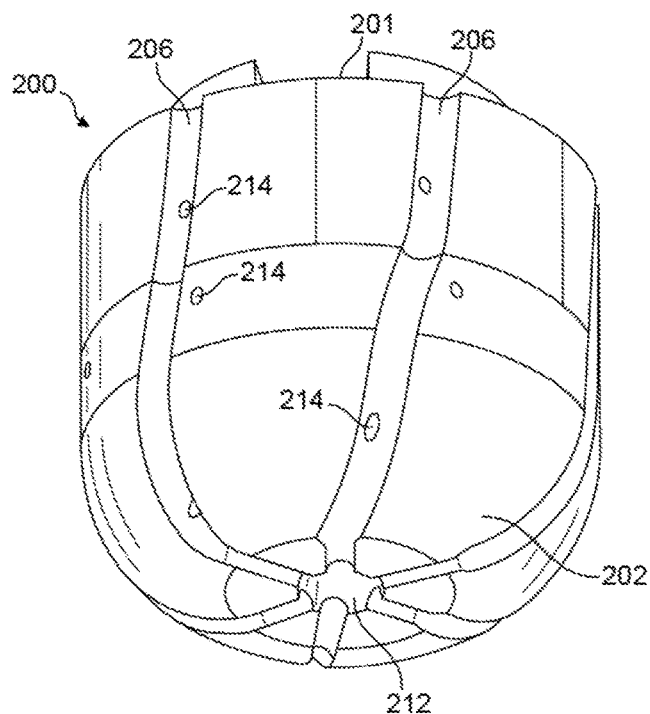
FIG. 5A is a schematic drawing showing a perspective view of a mold which may be used to form a bit head for a fixed cutter rotary drill bit.
Figure 5B:
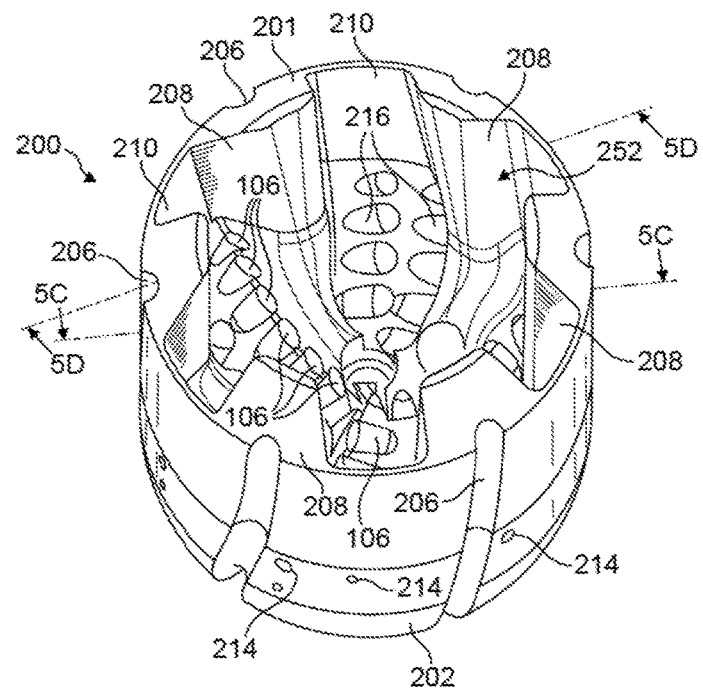
FIG. 5B is a schematic drawing showing another perspective view of the mold of FIG. 5A.
Figure 5C:
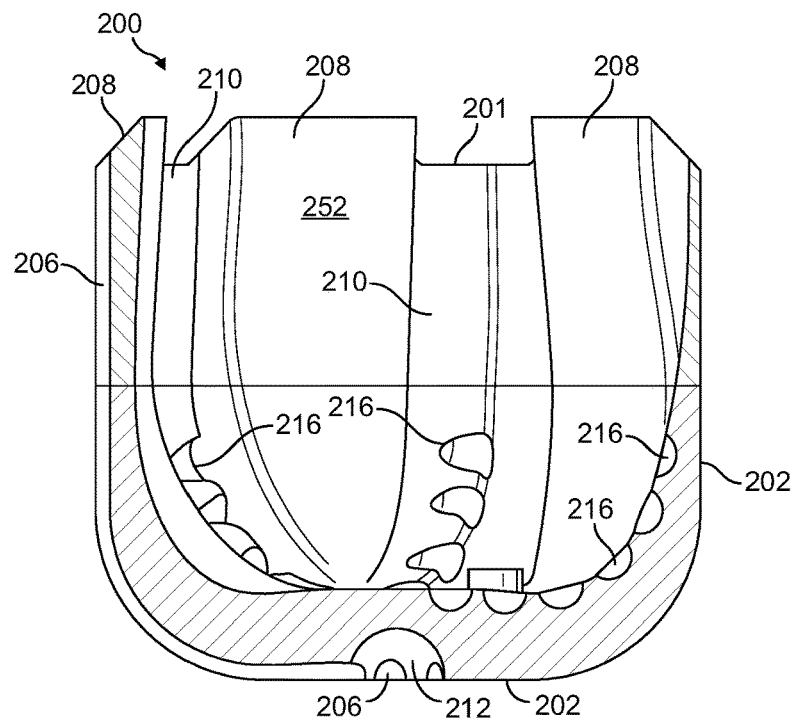
FIG. 5C is a drawing in section taken along lines 5C-5C of FIG. 5B.
Figure 5D:
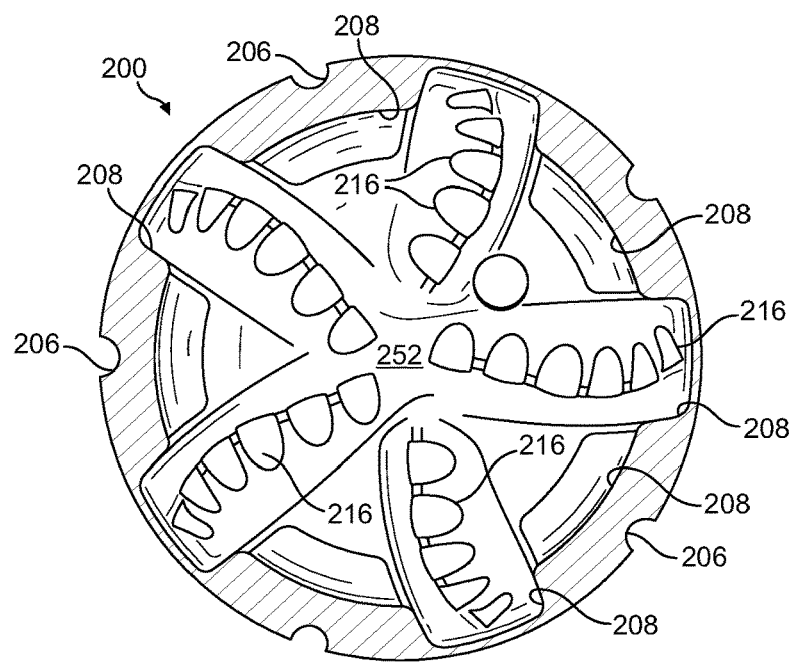
FIG. 5D is a schematic drawing in section taken along lines 5D-5D of FIG. 5B.

FIGS. 3 and 4 show details of a mold assembly that may be used to manufacture the matrix bit head 52. As shown in FIG. 3, the mold assembly includes a container 300. The container 300 may sometimes also be referred to as a "housing", "crucible" or "bucket". In this example, the container 300 is formed of three parts, a base or end piece 302, a middle ring piece 304 and an upper funnel 306. The container may equally be formed of more or fewer parts, for example, where appropriate, by dispensing with the top ring. The container may equally be formed as a single part piece. These parts may be connected together by threaded connecting portions, as illustrated. Alternative connections, such as slip fits, may also be used. The container 300 may be formed from graphite based materials, boron based materials and/or any other materials having satisfactory heat transfer characteristics, which typically means they should be relatively highly conductive. The material for the container 300 is also primarily selected to exhibit minimal shrinkage when subjected to the temperatures encountered during the molding process, thereby providing dimensional stability and good correlation between the original design and the molded product.

The mold assembly further includes a mold 200 which is contained in the container 300. The mold is formed by a 3D printing process and is then inserted into the base or end pieces 302 of the container 300. As shown in FIGS. 3 and 4, the shape of the outside of the closed end 202 of the mold 200 substantially matches the shape of the inside of the container 300. The mold 200 may be inserted into the base or end piece 302 before the ring piece 304 and funnel 306 are connected thereto. Alternatively, end piece 302 and ring piece 304 may first be connected together before the mold 200 is inserted therein. This provides better access to the lower portions of the container 300, and to the mold cavity 252 through the open and 201 of the mold 200, and allows the mold 200 and matrix materials 131, 132, 133 in the container 300 to be built up in stages. This construction also allows the use of different diameters in the funnel 306, ring piece 304 and base piece 302, which may not be possible otherwise (for example, if the funnel has a narrower internal diameter than the base piece then the mold 200, which has an outer dimension to match the interior of the base piece 302, cannot be inserted into container 300 through the funnel 306).

As shown in FIGS. 5A-5D, the mold 200 may be bowl-shaped, having an inner mold cavity 252 that is substantially a negative image of the item or component to be molded. Where the mold is thickest, i.e., at the places where the junk slots are to be formed, fluid flow channels 206 may be formed. These channels can be used to circulate a fluid for heating or cooling of the mold 200 and the materials therein. Channels 206 may be connected to a recessed portion or chamber 212 at the closed end 202 of mold 200, to and/or from which heating or cooling fluid may be supplied. A plurality of internal tube ways or flow paths 214 may also be formed within selected portions of mold 200. Flow paths 214 may communicate gases associated with heating and cooling of mold 200 to associated fluid flow channels 200 and/or to exterior portions of mold 200. For some applications one or more openings (not expressly shown) may be formed in container 300 to accommodate communication of heating fluids and/or cooling fluids with chamber 212. The temperature and/or flow rate of such heating and/or cooling fluids may be varied to control the heating and cooling process.

Within the mold cavity 252, displacements 208 project into the cavity to define the junk slots 56 between cutter blades 54. In the past, displacements 208 may have been formed as separate pieces and then installed in the mold cavity 252. With the use of 3D printing, however, the displacements 208 may be formed integrally with the mold 200. In a similar manner, whereas it was previously necessary to form a relatively simple mold and then for a skilled mold fabricator to install various other displacements, such other displacements may now be formed as an integral part of the mold 200 by 3D printing. This can result in improved product consistency and process repeatability. For example, where it has been known to form recesses or pockets 216 in the parts of the mold 200 which represent a negative blade profile 210, and to install inserts 106 in the holes, by which pockets 62 will be formed in the molded blades 54, these features may be formed with sufficient accuracy by 3D printing as an integral part of mold 20.

It is similarly known to install a "crow's foot" in the moil cavity 252. The crow's foot would normally include a consolidated sand core 150 placed on legs 142 and 144. Legs 142 and 144 may also be formed of consolidated sand. These displacements, which make up the crow's foot, provide internal passages through the matrix bit head 52 to the nozzles 60. Instead of forming these displacements from consolidated sand, they may be formed by 3D printing in the same way as displacements 208, either as separate components or as an integral part of mold 200.

In order to form the matrix bit head 52, the matrix materials 131, 132 and 133 are placed in the mold cavity 252, together with the metal cylindrical blank 36 and the crow's foot. Various fixtures (not expressly shown) may be used to position metal blank 36 within mold assembly at a desired location spaced from first matrix material 131. Infiltration material 160 is then loaded on top of the matrix materials and the metal cylindrical blank, as shown in FIG. 3. The entire mold assembly is then pre-heated, before being placed in a furnace. When the melting point temperature of the infiltration material 160 is exceeded, the infiltration material 160 flows down into the mold cavity, to infiltrate the matrix material. The entire mold assembly is then cooled, to allow the infiltration material 160 to solidify. The container 300 can then be disassembled, and the matrix bit head 52 is removed from the container. The mold 200 will be removed from the container 300, essentially affixed to the matrix bit head 52, and must then be broken away from the matrix bit head and removed to expose the molded matrix bit head 52. The third matrix material 133 may then be machined to obtain the final desired shape of the matrix bit head 52, and shank 30 can be welded onto the top of the metal cylindrical blank 36 to obtain a matrix bit body 50 (not necessarily in this order).

After the mold 200, including the cutter inserts 106, has been removed from the matrix bit head 52, the pockets 62 in the matrix bit head are revealed, as shown in FIG. 2. Cutting elements 64 may then be installed in each of the pockets 62, for example by brazing.

One advantage of this type of mold construction is that only the mold 200 has to be destroyed in order to expose the matrix bit head, whilst the container 300 remains intact. This is more economical than in previous mold constructions, in which the mold and container were both fabricated together as a single body, which would all be destroyed in order to remove the cast matrix bit head from the mold after the molding process. Since the mold printing process is time consuming and the material used to print the mold may be expensive, savings in time and cost may be achieved by using the re-usable container 300 with a separate, single-use printed mold 200. The container 300, being re-usable, may also be fabricated by a more expensive and/or time-consuming process, such as by CNC (Computer Numerical Control) milling, which may improve the quality and/or durability of the container without compromising overall productivity or increasing overall production costs of the objects being molded therein.

The heating and cooling process for manufacturing the matrix bit head 52 in this way, however, is not without its difficulties. Careful control has to be maintained over the heating and cooling of the mold assembly, to ensure that the infiltrating material 160 will completely infiltrate the matrix materials 131, 132 and 133. This is not always easy to achieve, since leaching of chemicals from the matrix materials 131, 132 and 133 into the infiltration material 160 can occur as the infiltration material flows down into the mold cavity 252. The chemicals leached into the infiltration material 160 can change the overall chemical composition of the infiltration material 160, for example so as to raise the melting point of the infiltration material 160. Furthermore, unless a uniform high temperature is achieved throughout the matrix materials 131, 132 and 133, there may be regions within the matrix material(s) that remain at a lower temperature than other parts of the mold assembly. This can happen, in particular, due to the fact that the mold 200 is typically formed from a clay or sand composition which has a lower thermal conductivity than the material from which the container 300 is made, so that the mold 200 tends to act as a thermal insulator. In addition to this, the matrix materials may not themselves be good thermal conductors.

As a result, it is not unknown for the infiltration material 160 to infiltrate only partially into the matrix materials 131, 132 and 133, before solidifying prior to complete infiltration. This may be as a result of a combination of the factors noted above. Although a uniform temperature throughout the mold as assembly may, in general, be obtained by heating the mold assembly more gradually and/or for a longer period of time, thereby allowing the temperature within all parts of the mold assembly to stabilize at a uniform temperature, this will increase the length of time and amount of energy needed in order to carry out the molding process for each matrix bit head, thereby rendering the process less economical.

Further difficulties arise during the cooling of the matrix (infiltrated) bit head, which can result in molding defects. Specifically, as certain parts of the material in the matrix bit head 52 cool more quickly than other parts, cracks can form in the solidifying matrix material. Cracks of this kind will tend to form where one part of the matrix material solidifies more quickly than an adjacent part. Since materials tend to contract as they solidify and cool, stresses are generated between adjacent regions of material that contract by different amounts, which can lead to stress fractures. This may be exacerbated by one region of the materiel forming the bit head cooling more quickly than an adjacent region of the material, and/or due to the adjacent regions having different coefficients of thermal expansion. Areas of the matrix bit body particularly susceptible to such cracking are the extreme (outer) portions of the cutter blades 54, the interface region between different matrix materials 131, 132 and 133, and the interface between the matrix materials 131, 132, 133 and the metal cylindrical blank 36.

These stresses, and consequential cracking of the matrix bit body 52 are, in general, reduced in the case that the matrix bit head is allowed to cool and solidify from the bottom, i.e. from the tips of cutter blades 54 first, with the upper, gaga parts of the matrix bit head 52 and the metal cylindrical blank 36 cooling last. However, it is not always possible to obtain the desired degree of control over the temperature distribution and rates of cooling throughout the mold assembly, in particular if it is desired to cool the mold assembly within an acceptable period of time.

The present inventors have identified one particular cause for reduced control of the heating and/or cooling of the mold assembly as being the thermal characteristics of the mold 200. As noted above, the more usual materials from which mold 200 is printed by the 3D printing process tend to act as thermal insulators. This tends to reduce the speed with which any heating or cooling can be applied to the bottom portion of the mold assembly, in which the mold 200 is disposed, and will tend to cause the lower portion of the mold assembly to heat or cool more slowly than the upper portion, which is the reverse order to that normally desired.

An improved mold design has therefore been conceived, aimed at improving the degree of thermal control in the heating and cooling cycle for molding the matrix bit. An embodiment of such a mold 400 is shown in FIG. 6.

Figure 6:
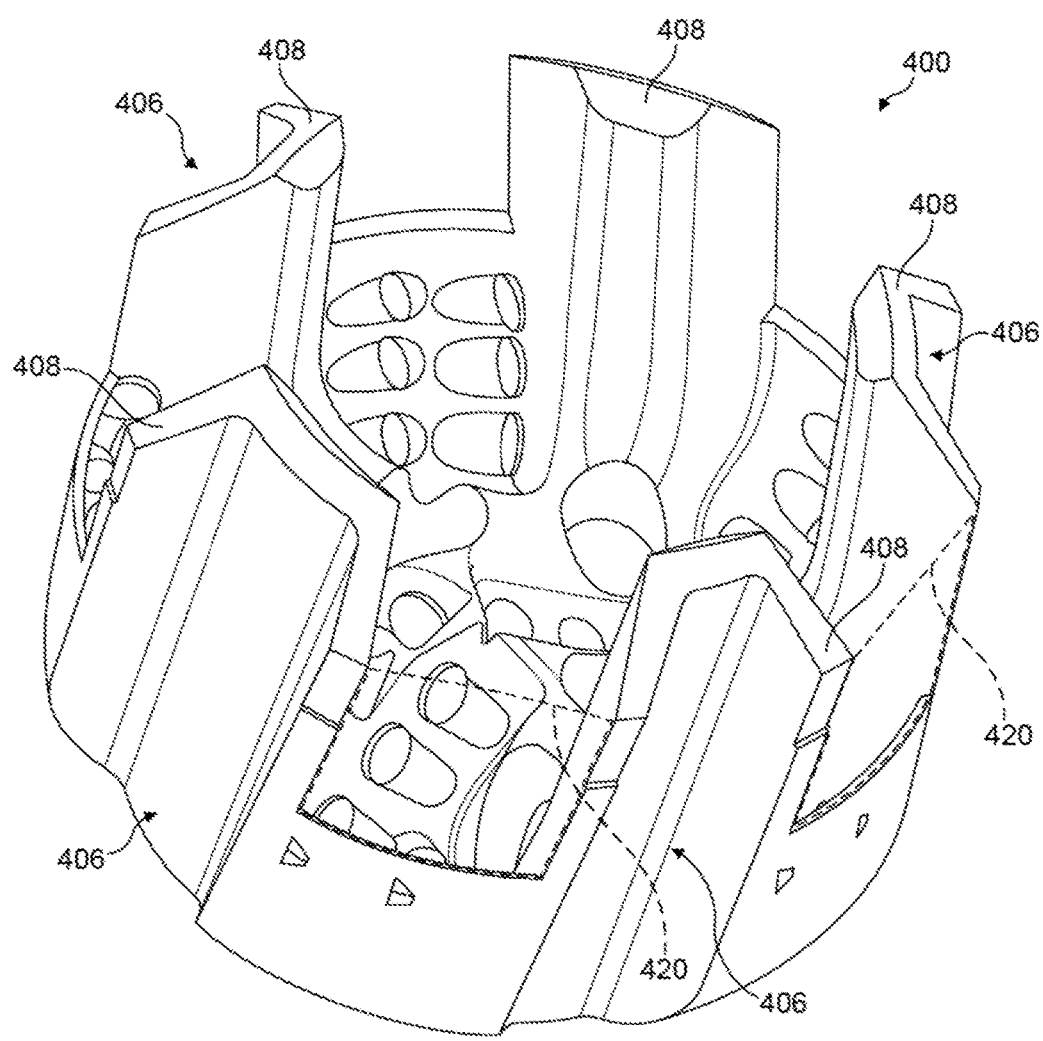
FIG. 6 is a schematic drawing showing a perspective view of another mold which may be used to form a bit head for a fixed, cutter rotary drill bit.
Figure 7:
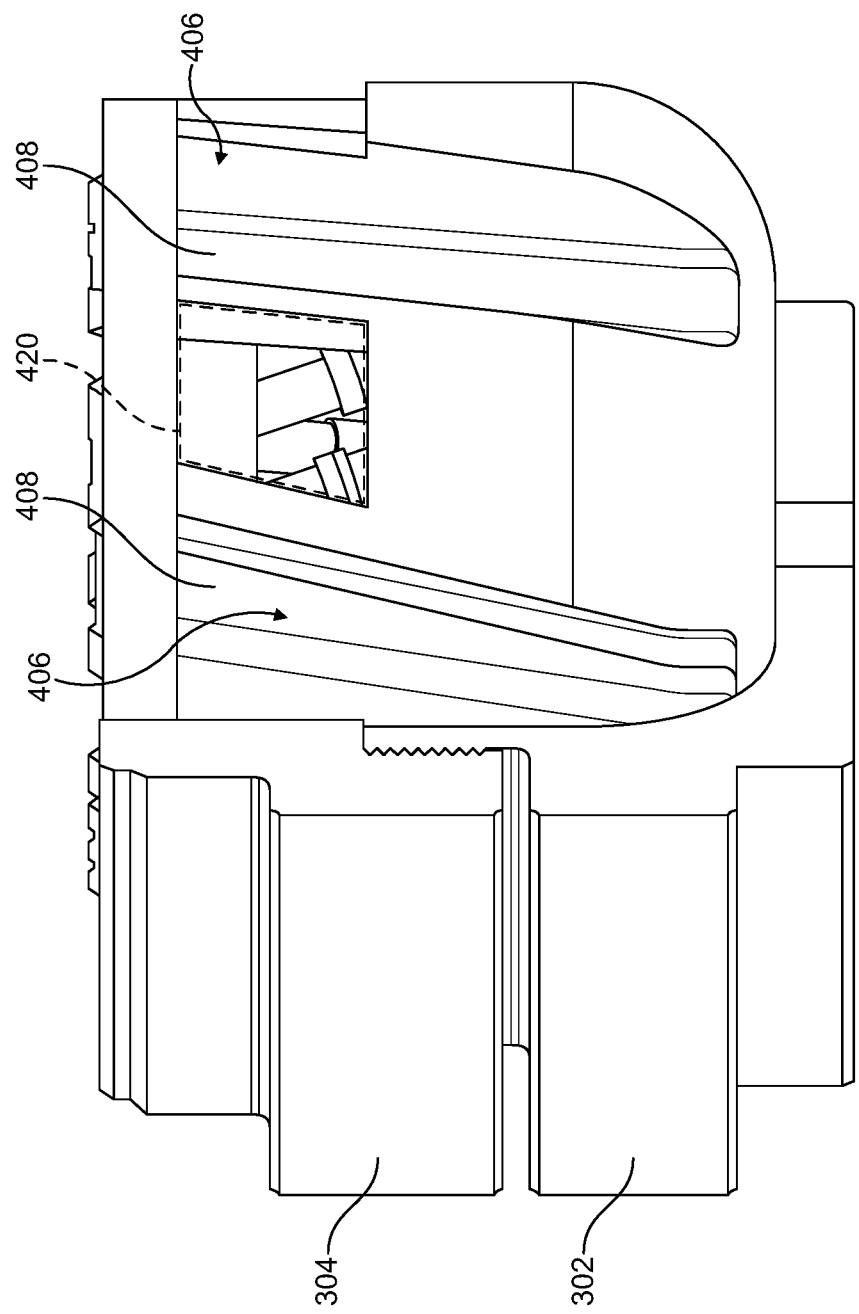
FIG. 7 is a schematic drawing showing a partially cut-away side view of the mold of FIG. 6 installed in a FIG. 8 is a schematic drawing showing a perspective view of a matrix bit head.
Figure 8:
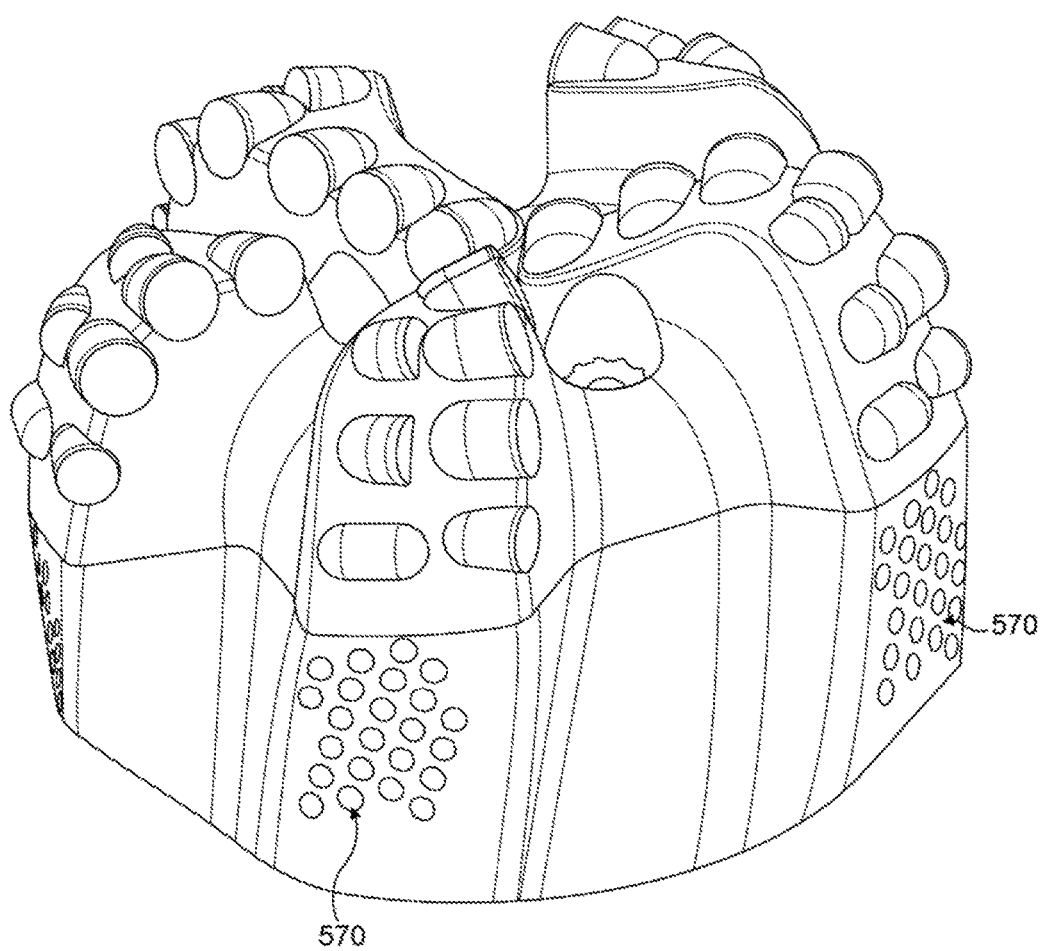

The mold 400 shown in FIG. 6 is to be installed in a container 300, in the same manner as the mold 200 shown in FIGS. 3, 4 and 5A to 5D. This is illustrated in FIG. 7, which shows the end piece 302 and ring piece 304 of a container 300 in a partially cut-away view to reveal the mold 400 installed therein. The mold 400 differs from the mold 200, however, is several notable respects.

Immediately noticeable is that the thickness of the mold 400 has bean reduced in the region of the displacements 408 as compared with the displacements 208. This leaves wide and deep recesses 406 between the outside of the mold 400 and the inside of the container 300, when mold 400 is installed therein. The recesses 406 are large compared to the fluid flow channels 206 shown in FIGS. 5A to 5D. Use of these recesses 406 can be made in order to improve the control of the heating and cooling cycle. This may be achieved, it one way, by firstly minimizing the thickness of the walls of the mold 400. The thickness of the walls of the mold 400 can be minimized down to the minimum thickness that is required in order to maintain the structural integrity of the mold 400, not only under the weight of the matrix materials 131, 132, 133 and infiltration material 160, as well as other components such as the crow's foot and metal cylindrical blank 36, is the mold assembly, but also during fabrication and handling of the mold, including installing the mold 400 in the container 300. With the thickness of the walls of mold 400 minimized, the insulative effects of the mold are likewise minimized, meaning that the heating and cooling of the materials within the mold can he achieved more rapidly in response to changes in the temperature external to the mold 400.

Increased control over the heat flow characteristics through the mold 400 can, however, be further improved by judiciously selecting materials to be placed within the recesses 406, between the mold 400 and the container 300 into which the mold is installed. The materials are selected based or their thermal conductivity relative to the printed mold material. If a highly thermally conductive material is inserted into the recesses 406, then heat will be transmitted more rapidly across the insulative barrier provided by the mold wall than if the recesses were filled with the printed mold material, which will improve the ability of the manufacturer to control the internal temperature of the mold assembly in response to command inputs. Graphite powder and certain types of sand and ceramics are suitable materials that will often have a higher thermal conductivity than the mold material. Likewise, by installing a relatively thermally insulative material in the recesses 406, the rate of transfer of heat through the mold walls can be reduced (as compared to if the recesses were filled with the printed mold material). Accordingly, by identifying areas of the matrix bit body 52 which are cooling too slowly or too rapidly, the manufacturer of the matrix bit head can determine whether to introduce a more thermally insulative or a more thermally conductive material into the recesses 406. Of coarse, where appropriate, different materials may be provided in one, more or all of the individual recesses 406. For example, to facilitate cooling of the molded object from the bottom of the mold first whilst retaining more heat at the top of the mold, the bottom portions of recesses 406 may be filled with relatively conductive material and the top portions of the recesses 406 filled with relatively insulative material.

Recesses 406 will, of course, also be suitable for use as fluid flow channels, in the same manner as fluid flow channels 206 shown in FIGS. 5A to 5D. However, with the additional thermally insulative or conductive materials installed in the recesses and/or due to the thinner mold walls, a more rapid response to the introduction of heating and/or cooling fluids into the recesses 406 can be acquired, thereby resulting in a greater degree of control of temperatures of the materials within the mold. Furthermore, the heat conducted through the thin walls of the mold 400 in the displacements 408 is delivered closer to the centre of the mold assembly, and so is more effective to heat all the way through the mold assembly, in particular, all the way through matrix materials 131, 132 and 133.

The mold 400 additionally includes gaps or windows 420 in the upper portion of the mold 400 between adjacent displacements 408. In these regions, there is no printed mold material, such that, when the mold 400 is installed in the container 300, the inner wall of the container 300 will act as the local portion of the mold cavity through these windows 420. The result will be that, in these regions, the material from which the matrix bit head is being molded will be in direct contact with the container 300. This is advantageous, since container 300 is typically formed of a highly conductive material, such as graphite, meaning that thermal control in the region of these windows 420 will in general be greater. The portions of the matrix bit body 52 in the region of the windows 420 will in general correspond to the gage portions 570 of the matrix bit head 52 (see FIG. 8). However, the formation of windows may be desirable in other portions of the mold 400, to bring the matrix and infiltration materials 131, 132, 133, 160 being molded into direct contact with the container 300. For this purpose, the container 300 may be shaped on the inside with a surface than will locally form parts of the negative image of the matrix bit head, providing that the shape of the inside of the container still permits mold 400 to be removed after molding the matrix bit head 52, such that container 300 can be re-used.

Whereas plaster or sand materials have normally been preferred for the 3D printing of molds, it is expected that the mold 400 of FIG. 6 could equally be formed from a relatively more thermally conductive material. Graphite powders, boron nitride powders and other matrix material powders which are stable in temperature ranges associates with forming matrix bit bodies may be satisfactorily used. Such powders may have better thermal conductivity and/or better dimensional stability as compared with some sand and/or plaster powders used to form metal casting molds. Silica sands, clay sands, quartz sand (SiO2), zircon sand and barium, oxide sand are examples of some different materials which may be used to form a mold with desirable heat transfer characteristics at specific locations in an associated mold cavity. Zircon sand has been identified, in particular, as having good thermal conduction and other properties that make it useful in forming printed molds.

In this connection, it is contemplated that different parts of the mold 400 may be molded from different materials in the 3D printing process. Whereas it has previously been suggested that different materials can be used in different respective layers, it is contemplated that, for the mold 400, the material from which the mold is printed can be varied not only as between adjacent layers of the printed mold 400, but also in different regions of each layer or the mold 400. This can be achieved by providing a 3D printing machine capable of printing different materials within different regions of the same layer.

One way in which this may be achieved is to first provide a layer of a first material, and to selectively adhere this to underlying layers. The non-adhered material is then selectively removed, which may be achieved, for example, by suction or by blowing away the material, or by burning away or otherwise removing one material, for example with a laser. A layer of a second material is then applied, and is selectively adhered to the underlying layers in regions of the same layer to which the first material was previously just applied, in regions where the first material was not adhered to the underlying layers. Alternatively, different materials may be selectively applied in different regions of the same layer by the 3D printing machine, and selectively adhered to the underlying layers in the usual way.

One available use for this technique is to print portions of the mold 400 which not only have different thermal conductivity, but also to print different portions of the mole which have different electrical conductivity. Electrically conductive portion of the mold may be excited by appropriate electromagnetic radiation, and will then get hot, thereby serving as a heat source for heating the material in the mold, or for achieving a reduced rate of cooling.

Figure 10:
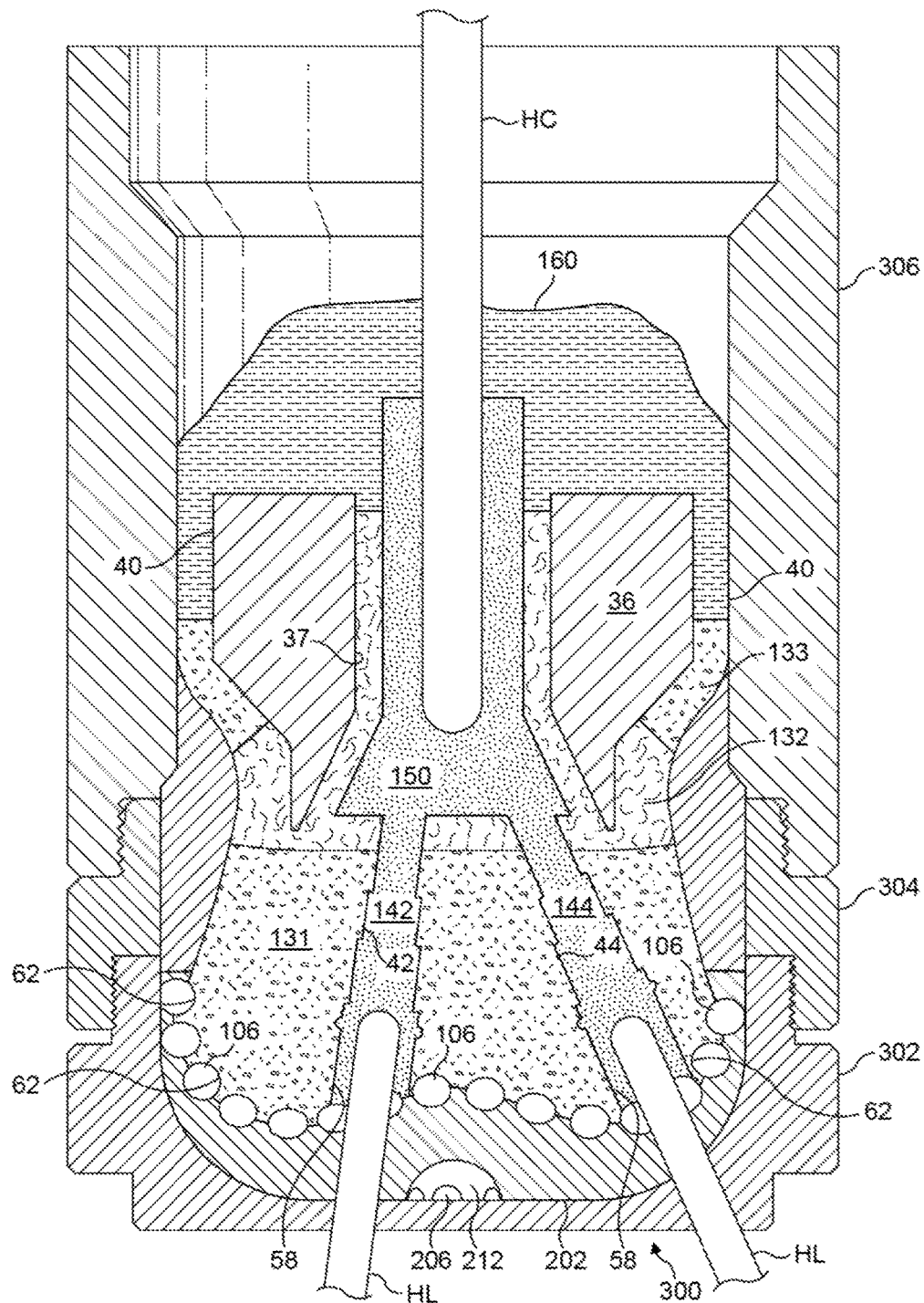
FIG. 10 is a schematic drawing showing a cross-sectional view through a mold assembly that may be heated and cooled to mold a fixed cutter drill bit, the mold assembly including heat sources to control the heating and/or cooling of the mold assembly.

It is similarly contemplated, with reference to FIG. 10, that heaters HC, HL, such as glow bars, induction heaters or any other suitable type of heating element, may be built into the mold assembly, in order to obtain better and more direct control of the temperature distribution throughout the mold assembly during the heating and/or cooling process. For example, it will be appreciated that, whereas the crow's foot has traditionally been formed, as a separate consolidated sand component which would then be installed in the mold cavity, before filling the mold cavity with the matrix materials 131, 132 and. 133, it is, in fact, possible to form the crow's foot using 3D printing. The crow's foot may be printed as one or more separate components, and then installed in the mold cavity of mold 400, or the crow's foot may be printed together with the mold 400, as an integral part of the mold 400. This latter alternative may be generally desirable in terms of more efficiently printing the necessary mold components and reducing the number of assembly steps needed to form the mold assembly, although the crow's foot being integrally molded in this way may inhibit access to the mold for carrying out any work on the mold inner surface. It is also contemplated, that only part of the crow's foot may be printed in this way, for example, only the legs 142 and 144, or a portion of each of the legs extending from the base of the mold cavity.

The heaters HC, HL in the crow's foot may be provided by forming all or portions of the crow's foot of an electromagnetically excitable material that, when excited, will act as a heat source for heating the matrix materials 131, 132 and 133, and other materials in the mold cavity, or for controlling the rate of cooling of the materials in the mold cavity. It is also contemplated that components of the crow's foot may alternatively include any other known type of heater, either incorporated into a consolidated sand component or incorporated into a printed component of the crow's foot, so as to provide the necessary heat source. One form of heat source for transferring heat into the inside of the mold assembly may simply take the form of a relatively highly thermally conductive pathway, for example formed of rods of graphite, by which heat from outside the mold assembly may be rapidly be transferred to the inside of the mold, assembly. In this regard, it will be appreciated that the use of 3D printing will in fact allow the legs 142, 144 of the crow's foot to be formed of complex, non-linear shapes, which may facilitate the ability to build a heater HL into these components. Indeed, providing that the flow of drilling fluid or mud through the fluid flow passageways 42, 44 is not restricted and the structural strength and integrity of the matrix bit head 52 is not unduly compromised, the shape and position of the legs 142, 144 may be designed specifically to provide for efficient heating of the volume of material in the mold cavity by a heat source in the legs 142, 144.

Utilizing components of the crow's foot to heat the mold assembly may be advantageous, since it will allow heat to be applied from the center of the mold assembly. By using the crow's foot in this way, together with any heat sources external to the mold cavity, material, in particular the matrix materials 131, 132 and 133, in the mold cavity can more reliably be heated throughout the volume of the mold cavity. Furthermore, if internal eat sources are provided in combination with external heat sources (i.e., heat sources outside the mold cavity), such as when part of the mold 400 is formed from a material that can be excited to generate heat, or when the mold assembly is loaded in a furnace, it becomes possible to achieve improved directional heating and cooling of the mold assembly, by controlling the relative temperatures of the internal and external heat sources. A greater level of control over the heating of the material in the mold assembly, as well as over the direction of solidification and the rate of solidification and cooling within the mold cavity, can thereby be obtained. This will have the obvious consequences of ensuring fewer mold defects arise, as well as potentially reducing the amount of time required to heat and cool the mold assembly during the molding process.

Even where no internal heat sources are provided within the mold cavity, external heat sources may be provided outside the mold cavity but within the mold assembly. For example, as mentioned above, part of the mold 400, or instead or also the container 300, may be formed from a material that can be electromagnetically excited to generate heat. Equally, the mold and/or container may be formed to receive similar kinds of other heaters as are contemplated for use in the crow's foot, such as glow bars, induction heaters or any other suitable type of heating element. Such heaters may be built into the mold and/or container, or may be assembled together therewith when forming the mold assembly. Such heaters provide more direct and responsive heating, and may facilitate the control of directional heating an/or cooling of the materials within the mold cavity during molding of an object.

Furthermore, since the use of 3D printing allows the mold to be formed into any desirable shape, it further becomes possible to incorporate heating elements not only into to crow's foot, but also into other parts of the mold assembly. For example, glow bars, induction heaters or thermal conduction paths of highly thermally conductive material may be incorporated into the container 300, or they may be installed in the recesses 406 formed in the region of the displacements 408 between the mold 200 and the container 300. The container 300 and mold 200 may incorporate a heater into the bottom of the mold assembly, in order to obtain control of the heating process at least in the vertical direction of the mold assembly.

It will be appreciated that a combination of such heating elements may be utilized in the mold assembly, according to need or preference. For example, it may be difficult to obtain control over individual heat sources where these are formed of an electromagnetically excitable material from which part of the mold 200 or crow's foot is formed. This is because, in general, the excitation needed to cause this type of material to heat up will also cause all similar material in the mold assembly to heat up in the same way. Bar heaters, or other similar elements, by contrast, may be separately and individually controlled, meaning that the supply of heat through these elements, together with the supply of heat from any other heat source, can be manipulated to achieve the desired directional heating and/or cooling during the molding process.

Figure 9:
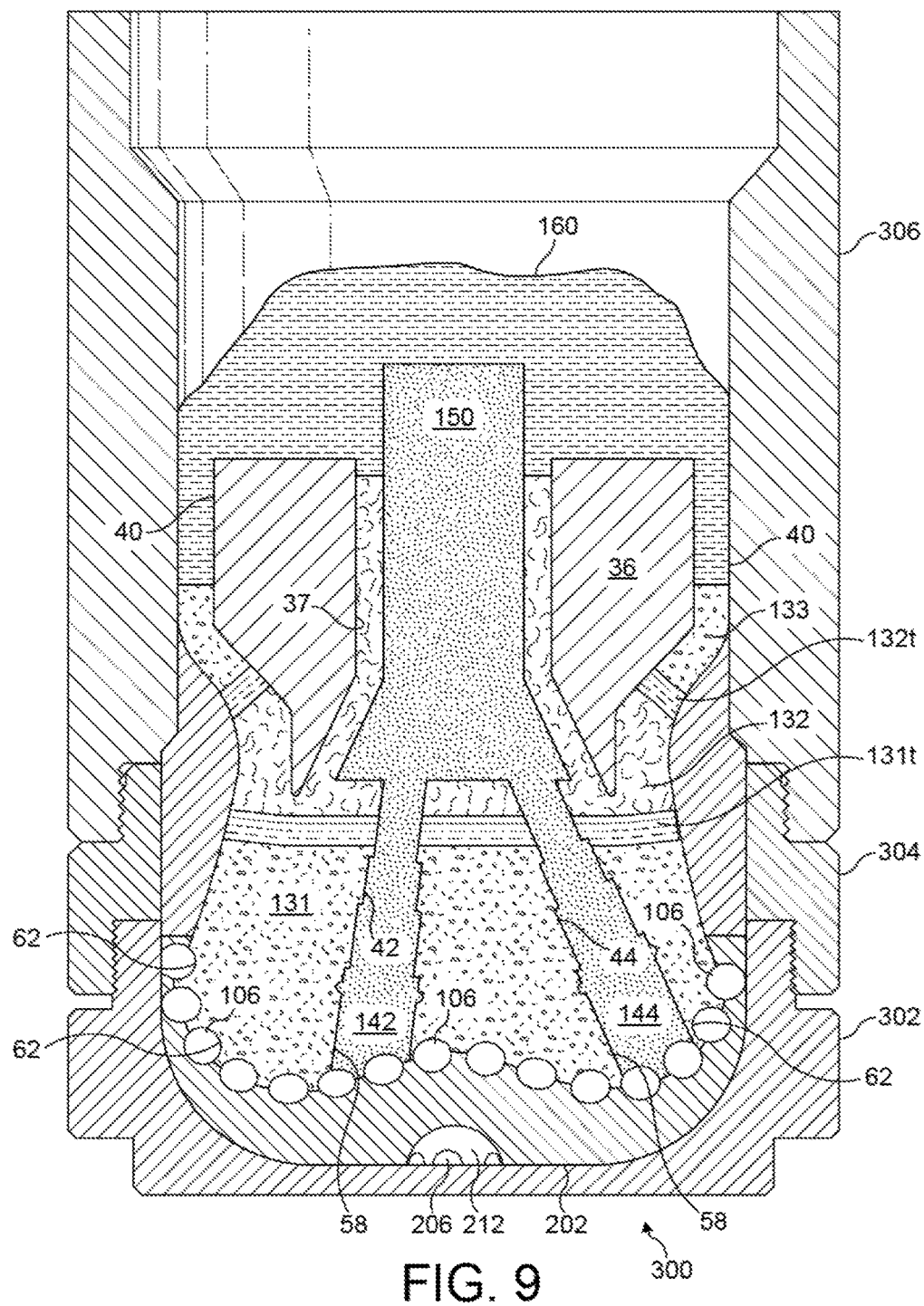
FIG. 9 is a schematic drawing showing a cross-sectional view through a mold assembly that may be heated and cooled, to mold a fixed cutter drill bit having the same shape as that of FIG. 1, but including transition regions between the different matrix materials.

It is additionally contemplated to further mitigate the problems of molding defects caused at the interface between different regions of the matrix materials 131, 132 and 133. In order to achieve this, as shown in FIG. 9, it is proposed to form transitional regions of matrix material 131t and 132t, throughout which the composition of the material in the matrix gradually changes from the first composition to the second composition, in a series of layers or intermediate regions. In this way, the materials properties between the adjacent regions can be changed gradually, meaning that the interface between the two types of matrix material will be less apparent and will tend to result in fewer cracks forming during the cooling process. These different layers or regions in the transitional interface between matrix materials 131, 132 and 133 may simply be formed as a number of additional layers, placed in the mold cavity in the usual way. Contemplated, however, is to print the layers of the transitional regions 131t and 132t, by adjusting the composition of the matrix material deposited and printed in each layer. This may be done by providing a plurality of different matrix materials of different, mixed compositions and printing them in turn, or by varying the composition of one of the three main matrix materials in the printer by mixing-in more of one or other components between deposition of the successive layers in the transitional region.

Alternatively, it will be appreciated that, where a 3D printing machine is provided that has the ability to print more than one material, the same machine may, in fact, be used to print the matrix material or materials 131, 132 and 133 in the same layers in which the mold material or materials are printed. The technique prints the matrix material in each layer of the mold assembly, in a manner that is similar to that proposed above for forming different portions of individual layers of the printed mold using different materials. If such a technique is used, it will, in general, also be preferable to print the crow's foot at the same time as printing the mold 400 and matrix materials 131, 132 and 133 in the successive layers. In this way, the entire mold assembly to be installed into the container 300, apart from the metal cylindrical blank 36 and the infiltration material 160, may be formed by a single 3D printing process using two or more different materials.

In such a technique, it will be necessary to, at least temporarily, bind the matrix material in each layer to the matrix material in the layers above and below. However, the bonding between the layers of matrix materials in this example is only needed to allow the 3D printing process to take place, prior to infiltrating the matrix material with the infiltration material 160. The layers of matrix material may be bonded by the same printing process that is used to bond the layers of the mold material, or by an alternative process. For example, if a solvent, activator or adhesive is applied to the successive layers of mold material in order to bond the mold material together, the same solvent, activator or adhesive may be applied, in principle from the same source such as an ink jet print head, onto the successive layers of matrix material. Alternatively, a different means for bonding the layers at mold material and the layers at matrix material may be used, for example by applying a solvent, activator or adhesive to the successive layers of mold material in order to bond the mold material together and by sintering or partially sintering the successive layers of matrix material together using a Selective Laser Sintering (SLS) process, or the like. In the latter case, a 3D printing machine or apparatus having both a print head, for applying a solvent, activator or adhesive, and a laser, for sintering, which can preferably each be directed across the entire surface of each deposited layer of material is desirable.

Such processes can provide a number of advantages, which include the following. As one example, the use of printing to deposit matrix materials into the mold cavity 452 during the 3D printing process in which the mold 400 is formed will ensure that matrix material 131, 132, 133 is delivered to every part of the mold cavity. This overcomes problems which may otherwise arise in placing matrix materials into a mold cavity, such as not being able to flow the material into all parts of the mold cavity or the creation of void spaces. Normally, vibration is applied to the mold 400 to help to distribute the matrix materials being placed therein, in order to ensure that the mold cavity becomes completely filled, in all voids and recesses, with the matrix material 131, 132, 133

A 3D printing method of the type described above is known from U.S. Pat. No. 5,433,280 A, column 10, lines 3 to 17, for directly printing a matrix bit body having two different types of matrix powder in each layer. The method is used to print a matrix bit body having hard matrix powder, such as tungsten carbide, a ceramic, or other hard material in a thin region near the outer surfaces of the bit body, whilst the bulk of the bit head is formed of a tough and ductile material inside this outer shell of harder material. Alternative methods for printing layers of the bit head with two or more types of matrix powder are also contemplated, which may equally be used for printing a mold that includes two or more different materials in individual ones of the printed layers, as wall as for simultaneously printing layers including the mold material and the matrix material to be infiltrated. For example, rather than depositing uniform layers of each material and then removing unbonded powder prior to depositing the next type of material over the whole of the same layer, U.S. Pat. No. 5,433,280 A explains that the different materials in each printed layer of a bit matrix may instead be selectively deposited in the desired regions in each layer, and then the selectively deposited materials in each layer bonded to the underlying layers.

A method is also contemplated in which only the outer shell or relatively expensive, hard tungsten carbide or the like is printed, and the shell is then filled with the bulk, tough and ductile powder. A similar technique may be adopted for the printing of molds, whereby only the material constituting mold 400 and a thin layer of the hard matrix material 131, in a shell of the matrix bit head, are deposited in each layer, the empty shell being subsequently filled with the bulk, tough and more ductile powder 132, in the way more normally used for filling a mold with matrix powder. Different methods may also be employed for bonding the powder in each layer. For example, the method of bonding the deposited layer of powder may involve spraying or printing a binder over the deposited layer, spraying a metal binder over the deposited layer, or spraying an active ingredient over the layer to activate a binder that is already present in or coated on the deposited powder. The powder in each layer may alternatively be bonded together by sintering, Similar disclosure and further techniques are also provided in U.S. Pat. Nos. 5,957,006 A and 6,200,514 B1.

The foregoing description encompasses two different ways of 3D printing to obtain different powder materials in each layer, which may be thought of as "selective bonding" end "selective deposition", respectively.

Figure 12:
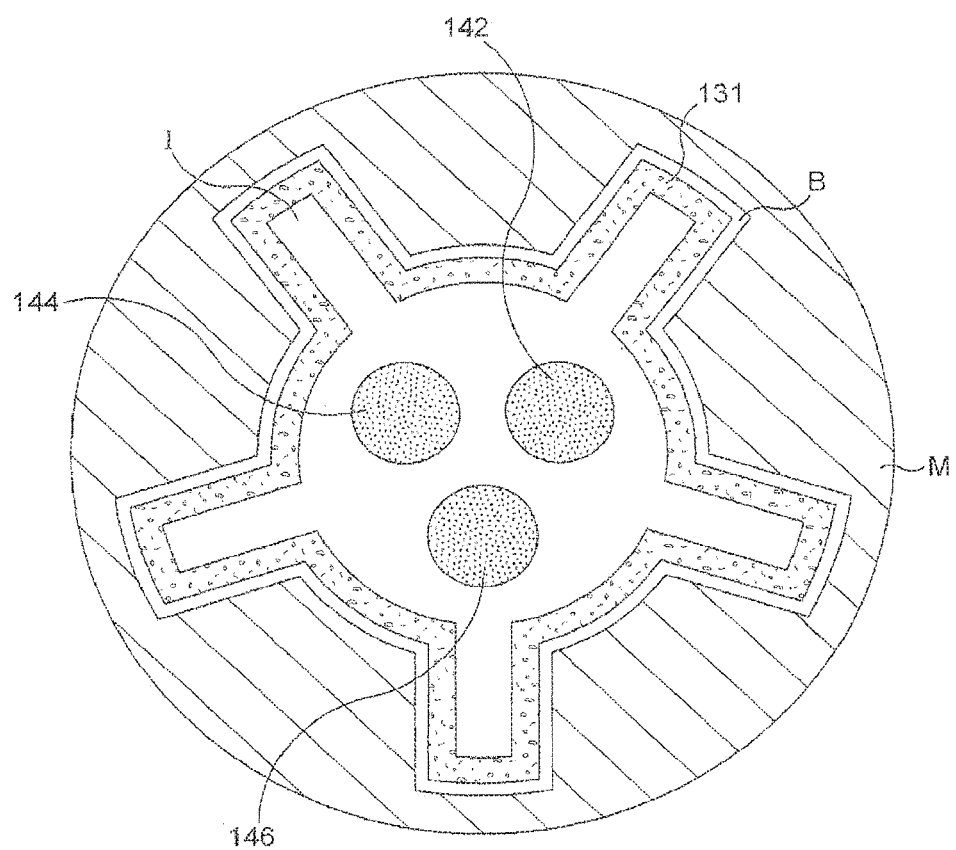
FIG. 12 is a schematic drawing showing a cross-sectional view through a printed body that includes, in the same layer, mold material and matrix material, the matrix material to be infiltrated to form a molded object, and further shows a thin barrier printed between the adjacent areas of mold material and matrix material.

With these and other methods, a construction similar to that shown in FIG. 12 may be obtained. FIG. 12 snows a schematic cross-sectional view through a printed body. The body includes mold material M of a mold which may be the mold 400 of FIG. 6 or a mold similar to mold 200 of FIGS. 5A-5D. A shell of matrix material 131 is printed inside of the and material M. and may be directly adjacent thereto. In the example of FIG. 12, three legs 142, 144, 146 of a crow's foot are optionally formed integrally with the printed body. Internal space I may either be printed with a matrix material, for example more tough and ductile material 132, or may be left empty, such that the matrix material 131 forms a shell into which matrix material 132 may later be filled, for example as a powder filled in the cavity I in the usual way.

The above techniques may be particularly applicable for use in printing molds having mold cavities that have "overhangs" or "hidden recesses", into which, using conventional mold-filling techniques, it can be problematic to get the matrix material to flow into and fill the hidden recess or overhung region in the mold cavity. If this occurs, voids may remain in the infiltrated matrix object, and the molded object will not obtain full density or structural integrity in the hidden recesses or overhung regions. However, by printing all, or a portion of the matrix material at the same time as the mold material, at least in the overhung regions or hidden recesses, the mold cavity can be assuredly filled and the occurrence of voids in the matrix material and related molding defects avoided.

In such embodiments, it is acknowledged that the boundary between the matrix powder and the mold inner surface may become critical in order to ensure that the mold 400 can eventually be removed from the infiltrated matrix bit bead 52. It is contemplated that a very thin band of yet another material B could be printed between the mold material M and the matrix powder 131 (or 132 or 133) that will form the matrix bit head 52, as a barrier material. This additional thin layer can be thought of as a release layer that prevents the infiltration material 160 from infiltrating into the mold 400 when it is melted and used to infiltrate the matrix powders 131, 132, 133 of the matrix bit head 52. Barrier material B end/or matrix material 131 could also equally be printed around the legs 142, 144 and 146 of the crow'foot, regardless of whether internal space I is printed with matrix material of this is later filled into the internal space in powder form.

Considering further the molding of a matrix bit head 52, the skilled reader will appreciate that the printed mold 400 and/or printed layers of matrix bit head 52 are still to be inserted, in a container 300 and infiltrated by an infiltration material 160. However, it will be apparent that by printing a mold 400 and at least part of the matrix bit head 52, where that at least part of the matrix material of the matrix bit head 52 is to be printed as a self- supporting body of bonded, layers of matrix powder 131, 132, 133, the structural requirements placed on the mold 400 will be reduced, since the mold 400 and the matrix material 131, 132, 133 will form a unitary printed body having a combined structure. For example, it has already been acknowledged that it is possible to print the hard outer shell of the matrix bit head 52 as a self-supporting body to be filled with the bulk matrix material of the bit core (see U.S. Pat. No. 6,454,030 B1) . The result of this is that portions of the mold 400 may be printed that are unconnected to other portions of the mold 400 except by being bonded together through the matrix materials 131, 132, 133. In effect, this allows portions of the mold 400 to be entirely eliminated, i.e., such that the thickness of the mold wall is reduced to zero, whereby the inner surface of the container 300 will serve locally as the inner surface of the mold cavity. Taken to its extreme, the inner surface of the container 300 may provide the basic shape of the negative image of the matrix bit head 52, whilst the printed parts of the mold are effectively a series of "floating" displacements, merely sufficient to ensure the integrity of the shape of the matrix bit head 52 during the molding process, and to allow the infiltrated matrix bit head 52 to be removed from the container 300 without destroying container 300. As discussed above, this minimization of the amount of mold material present allows more direct and effective control of the heat flow through the mold assembly during heating and cooling.

The present inventors also propose a further line or development in the selective deposition of mold and matrix materials. The skilled reader will appreciate that until now all 3D printing processes make up the mold or matrix in successive horizontal layers, building up either from the top or the bottom of the mold or bit matrix, depending on which way up either is being printed. However, there are clearly limitations on the ability to print certain parts of the matrix bit head 52, or any other component. One particular issue would be the difficulty in printing layers up to and around an internal component of the mold assembly, such as the metal cylindrical blank 36. In a horizontally-layered structure, it would be necessary to print the matrix material and nearby parts of the mold 400 or of the crow's foot so as to define a recess into which the metal cylindrical blank can be installed before the infiltration material 160 is added. Similar issues can arise if heater elements are to be disposed in the crow's foot of other printed components or parts of the mold 400.

There is no particular reason, however, why the mold 400 and/or any of the matrix bit head 52, has to be printed in horizontal layers. Although existing 3D mold-printing techniques build make up the mold by printing successive flat layers, these do not have to be formed as horizontal layers.

Figure 11:
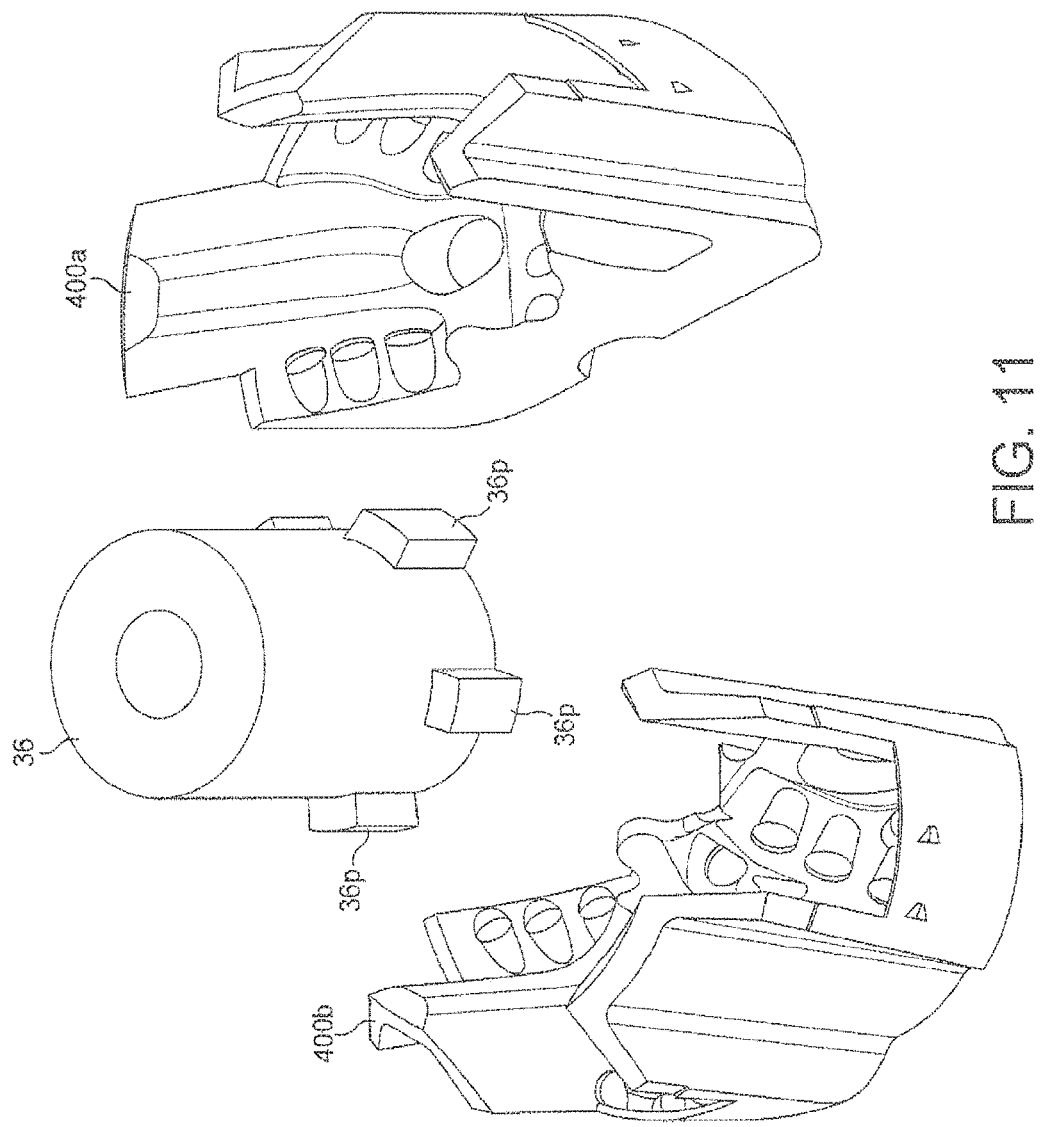
FIG. 11 is a schematic drawing showing an exploded perspective view of a mold formed of two segments to facilitate being fitted together around a metal blank in forming a mold assembly.

Furthermore, where it is not possible to use a unitary mold construction, in order to accommodate other components within the mold cavity, the mold 400 may be formed as two or more separate pieces that can be assembled together and installed in the container 300. For example, as shown in FIG. 11, if it is desired to use a metal blank 36 which has projections that may interfere with internal projections of the mold, or that is larger in diameter than the opening in the top of the mold 400, the mold 400 might be formed as two separate, substantially semi-cylindrical bodies 400*a* and 400*b*, which may be clamped or otherwise positioned and held together around the metal blank 36. Other numbers of mold segments may, of course, alternatively be used. This multi-part mold construction may be particularly useful in the case that a non-cylindrical metal blank is to be used. For example, the metal blank 36 shown in FIG. 11 is formed with projections 36*p* extending into each of the cutter blades 54, in order to provide strength and structural support to the inside of the cutter blades 54. Such an arrangement may require the mold 400 to be formed from a number of separate pieces.

Although in the foregoing it is contemplated that all portions of the mold 400 to be installed in the container 300 may be formed as a printed unitary body, it is also possible to install various types of displacement materials, mold inserts and/or preforms temporarily or permanently within mold cavity, depending upon each desired configuration for a resulting matrix bit head 52. Such mold inserts, displacements and/or preforms (not expressly shown) may be formed from various materials including, but not limited to, consolidated sand and/or graphite. Various resins may be satisfactorily used to form consolidated sand. Such mold inserts, displacements and/or preforms may be used to form various features of the matrix bit head, including, but not limited to, fluid flow passageways or junk slots formed between adjacent blades.

It will be readily apparent to persons having ordinary skill in the art that a wide variety of fixed cutter drill bits, drag bits and other types of rotary drill bits may be satisfactorily formed from a bit body molded in accordance with teachings of the present disclosure. The present invention is not limited to drill bit 20 or any individual features discussed in relation to the specific embodiments.

It will also be appreciated that the methods of design disclosed and claimed herein may be carried out, in whole or in part, by automated and/or computerized processes. It will be appreciated that a design, once arrived at, can be stored, or otherwise recorded, in a tangible form, including by sorting the design in coded or numerical form or as a CAD file, printing or drawing a representation of the design or by actually making an object to the design.

Although exemplary embodiments of the present invention and their advantages have been described in detail, it should be understood that various changes, substitutions and alterations can be made to such embodiments without departing from the spirit and scope of the disclosure as defined by the following claims.

The invention claimed is:

1. A mold assembly comprising:
    a container comprising graphite;
    a mold printed from a plurality of layers of mold material by 3D printing, the mold located in the container and comprising a mold cavity corresponding to a shape of a drill bit or bit head and, in an upper portion of the mold, windows with no printed mold material;
    wherein an inner wall of the container forms a portion of the mold cavity through the windows.

2. The mold assembly of claim 1, wherein the bit head is a steel bit head or a matrix bit head.

3. The mold assembly of claim 1, wherein the windows correspond to gage portions of the drill bit or bit head.

4. The mold assembly of claim 1, wherein the mold comprises two or more separate pieces, the mold assembly further comprises a metal blank, and the container holds the two or more separate pieces around the metal blank.

5. The mold assembly of claim 4, wherein the metal blank comprises projections extending into blades of the bit head or drill bit.

6. The mold assembly of claim 1, wherein at least one of the plurality of layers comprises a first material, the mold defines a space between the container and the mold, and the mold assembly further comprises a second material located in the space, the second material having a higher thermal and/or electrical conductivity than the first material.

7. The mold assembly of claim 6, wherein the second material forms part of a heat source.

8. The mold assembly of claim 6, wherein the second material is excitable by electromagnetic radiation to generate heat and thereby to act as a heat source.

9. The mold assembly of claim 6, wherein the second material forms part of a cooling source.

10. The mold assembly of claim 6, wherein the second material is positioned in a space created by a displacement that forms part of the mold, the displacement having a wall thickness, the displacement defining a negative image of at least part of a recessed portion of the drill bit or bit head, wherein the wall thickness of the displacement is at least partially minimized so as to form the space between an outer surface of the mold and an inner surface of the container.

11. The mold assembly of claim 6, wherein the mold includes an elongate displacement inside the mold cavity to define a fluid passageway through the drill bit or bit head, the elongate displacement comprising at least a third material having a thermal and/or electrical conductivity different from that of the first material.

12. The mold assembly of claim 1, further comprising a matrix material being molded that directly contacts the inner wall of the container in the windows.

13. A method of molding an object, the method comprising:
    placing a body of material in a mold assembly, the mold assembly comprising:
        a container comprising graphite;
        a mold printed from a plurality of layers of mold material by 3D printing, the mold located in the container and comprising a mold cavity corresponding to a shape of a drill bit or bit head and, in an upper portion of the mold, windows with no printed mold material, wherein an inner wall of the container forms a portion of the mold cavity through the windows; and
    heating and/or cooling a body of material by adjusting heat flow through the mold at a position adjacent the second material when an object is molded from the body of material in the mold.

14. The method of claim 13, further comprising selectively heating the mold assembly using the second material.

15. The method of claim 13, further comprising selectively heating the body of material using the second material.

16. The method of claim 13, further comprising exciting the second material by electromagnetic radiation to generate heat.

17. The method of claim 13, further comprising selectively cooling the mold assembly using the second material.

18. The method of claim 13, further comprising selectively cooling the body of material using the second material.

19. The method of claim 13, wherein the body of material directly contacts the inner wall of the container in the windows.

\* \* \* \* \*